(12) United States Patent
Okubo et al.

(10) Patent No.: US 10,540,275 B2
(45) Date of Patent: Jan. 21, 2020

(54) MEMORY CONTROLLER, INFORMATION PROCESSING SYSTEM, AND MEMORY EXTENSION AREA MANAGEMENT METHOD

(71) Applicant: Sony Corporation, Tokyo (JP)

(72) Inventors: Hideaki Okubo, Saitama (JP); Kenichi Nakanishi, Tokyo (JP); Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 15/523,763

(22) PCT Filed: Oct. 8, 2015

(86) PCT No.: PCT/JP2015/078608
§ 371 (c)(1),
(2) Date: May 2, 2017

(87) PCT Pub. No.: WO2016/103851
PCT Pub. Date: Jun. 30, 2016

(65) Prior Publication Data
US 2017/0357572 A1    Dec. 14, 2017

(30) Foreign Application Priority Data

Dec. 22, 2014 (JP) .................... 2014-258364

(51) Int. Cl.
*G06F 12/00* (2006.01)
*G06F 12/08* (2016.01)
(Continued)

(52) U.S. Cl.
CPC ........ *G06F 12/0246* (2013.01); *G06F 3/0659* (2013.01); *G06F 12/1027* (2013.01);
(Continued)

(58) Field of Classification Search
CPC .. G06F 12/0246; G06F 3/0679; G06F 3/0659; G06F 12/00; G06F 12/02; G06F 12/1027; G06F 13/28
(Continued)

(56) References Cited

U.S. PATENT DOCUMENTS 8,874,824 B2 * 10/2014 Luukkainen ........ G06F 12/0223
711/103
9,213,632 B1 * 12/2015 Song .................... G06F 12/0246
(Continued)

FOREIGN PATENT DOCUMENTS

JP    2012-221251 A    11/2012
JP    2013-033337 A    2/2013

*Primary Examiner* — Mohamed M Gebril
(74) *Attorney, Agent, or Firm* — Michael Best & Friedrich LLP

(57) ABSTRACT

To secure flexibility of the memory extension area which is secured on the memory of the host computer and used by the memory controller.
[Solution] A controller memory stores data corresponding to an area allocated to a memory in a memory controller configured to control the memory. An access control unit allocates a partial area of the controller memory to a host memory in a host computer and uses the areas as a memory extension area. The extension area managing unit performs management so that a size of the memory extension area in the host memory is changeable.

19 Claims, 43 Drawing Sheets

(51) Int. Cl.
*G06F 13/00* (2006.01)
*G06F 12/02* (2006.01)
*G06F 3/06* (2006.01)
*G06F 12/1027* (2016.01)
*G06F 13/28* (2006.01)

(52) U.S. Cl.
CPC ...... *G06F 13/28* (2013.01); *G06F 2212/7201* (2013.01); *G06F 2212/7203* (2013.01)

(58) Field of Classification Search
USPC .......................................................... 711/103
See application file for complete search history.

(56) References Cited

U.S. PATENT DOCUMENTS

| | | | |
|---|---|---|---|
| 9,229,854 B1* | 1/2016 | Kuzmin | G06F 8/654 |
| 9,311,226 B2* | 4/2016 | Mylly | G06F 12/0223 |
| 9,652,376 B2* | 5/2017 | Kuzmin | G06F 12/0246 |
| 9,817,749 B2* | 11/2017 | D'Abreu | G06F 12/0246 |
| 10,007,442 B2* | 6/2018 | Hahn | G06F 3/0613 |
| 2011/0296088 A1* | 12/2011 | Duzly | G06F 12/0246 711/103 |

* cited by examiner

FIG. 10

MEMORY EXTENSION AREA MANAGEMENT TABLE 221

| INDEX NUMBER | USE STATUS | DIVISION NUMBER | START ADDRESS | SIZE |
|---|---|---|---|---|
| 0 | IN USE | 1 | 0x00100000 | 0x10000 |
| 1 | IN USE | 2 | 0x40000000 | 0x0C000 |
| | | | 0x29241000 | 0x04000 |
| 2 | IN USE | 1 | 0x0AB63900 | 0x10000 |
| 3 | IN USE | 1 | 0x17D81650 | 0x10000 |
| ⋮ | ⋮ | ⋮ | ⋮ | ⋮ |
| 15 | UNUSED | 4 | 0x06E09510 | 0x01000 |
| | | | 0x000089A0 | 0x0C000 |
| | | | 0x5986F010 | 0x01000 |
| | | | 0x00694E00 | 0x02000 |

FIG. 11

ADDRESS TRANSLATION TABLE BLOCK POSITION INFORMATION

222

| ADDRESS TRANSLATION TABLE BLOCK NUMBER | LATEST DATA | CONTROLLER MEMORY INDEX NUMBER | MEMORY EXTENSION AREA INDEX NUMBER |
|---|---|---|---|
| 0 | CONTROLLER MEMORY | 0x00 | 0xFFFF |
| 1 | HOST MEMORY | 0xFF | 0x000B |
| 2 | HOST MEMORY | 0xFF | 0x0001 |
| 3 | MEMORY | 0xFF | 0x0003 |
| ⋮ | ⋮ | ⋮ | ⋮ |
| 511 | HOST MEMORY | 0xFF | 0x000F |

FIG. 12

ACCESS FREQUENCY INFORMATION TABLE
223

| ADDRESS TRANSLATION TABLE BLOCK NUMBER | ACCESS FREQUENCY |
|---|---|
| 0 | 5000 |
| 1 | 1 |
| 2 | 6821 |
| 3 | 369 |
| ⋮ | ⋮ |
| 511 | 10 |

FIG. 32

UNALLOCATED MEMORY EXTENSION AREA MANAGEMENT TABLE
227

| DIVISION NUMBER | START ADDRESS | SIZE |
|---|---|---|
| 3 | 0x123567A0 | 0x01000 |
| | 0x009877A0 | 0x01000 |
| | 0x00A9B234 | 0x00800 |

FIG. 34

MEMORY EXTENSION AREA MANAGEMENT TABLE

221

| INDEX NUMBER | USE STATUS | DIVISION NUMBER | START ADDRESS | SIZE |
|---|---|---|---|---|
| 0 | IN USE | 1 | 0x00100000 | 0x10000 |
| 1 | IN USE | 2 | 0x40000000 | 0x0C000 |
| | | | 0x29241000 | 0x04000 |
| 2 | IN USE | 1 | 0x0AB63900 | 0x10000 |
| 3 | IN USE | 1 | 0x17D81650 | 0x10000 |
| ⋮ | ⋮ | ⋮ | ⋮ | ⋮ |
| 1023 | UNUSED | 4 | 0x06E09510 | 0x01000 |
| | | | 0x000089A0 | 0x0C000 |
| | | | 0x5986F010 | 0x01000 |
| | | | 0x00694E00 | 0x02000 |

FIG. 37

MEMORY EXTENSION AREA MANAGEMENT TABLE
221

| INDEX NUMBER | USE STATUS | DIVISION NUMBER | START ADDRESS | SIZE |
|---|---|---|---|---|
| 0 | IN USE | 1 | 0x00100000 | 0x10000 |
| 1 | IN USE | 2 | 0x40000000 | 0x0C000 |
| | | | 0x29241000 | 0x04000 |
| 2 | RELEASED | 1 | 0x0AB63900 | 0x10000 |
| 3 | IN USE | 1 | 0x17D81650 | 0x10000 |
| ⋮ | ⋮ | ⋮ | ⋮ | ⋮ |
| 1023 | UNUSED | 4 | 0x06E09510 | 0x01000 |
| | | | 0x000089A0 | 0x0C000 |
| | | | 0x5986F010 | 0x01000 |
| | | | 0x00694E00 | 0x02000 |
| ⋮ | ⋮ | ⋮ | ⋮ | ⋮ |
| 65535 | UNUSED | 1 | 0x00000000 | 0x00000 |

FIG. 38

DATA BLOCK POSITION INFORMATION

252

| DATA BLOCK NUMBER | LATEST DATA | CONTROLLER MEMORY INDEX NUMBER | MEMORY EXTENSION AREA INDEX NUMBER |
|---|---|---|---|
| 0 | CONTROLLER MEMORY | 0x00 | 0xFFFFFF |
| 1 | HOST MEMORY | 0xFF | 0x000010 |
| 2 | HOST MEMORY | 0xFF | 0x000001 |
| 3 | MEMORY | 0xFF | 0x000003 |
| ⋮ | ⋮ | ⋮ | ⋮ |
| 65535 | HOST MEMORY | 0xFF | 0x000100 |

FIG. 39

DATA BLOCK ACCESS FREQUENCY INFORMATION TABLE

253

| DATA BLOCK NUMBER | ACCESS FREQUENCY |
|---|---|
| 0 | 5000 |
| 1 | 1 |
| 2 | 6821 |
| 3 | 369 |
| ⋮ | ⋮ |
| 65535 | 10 |

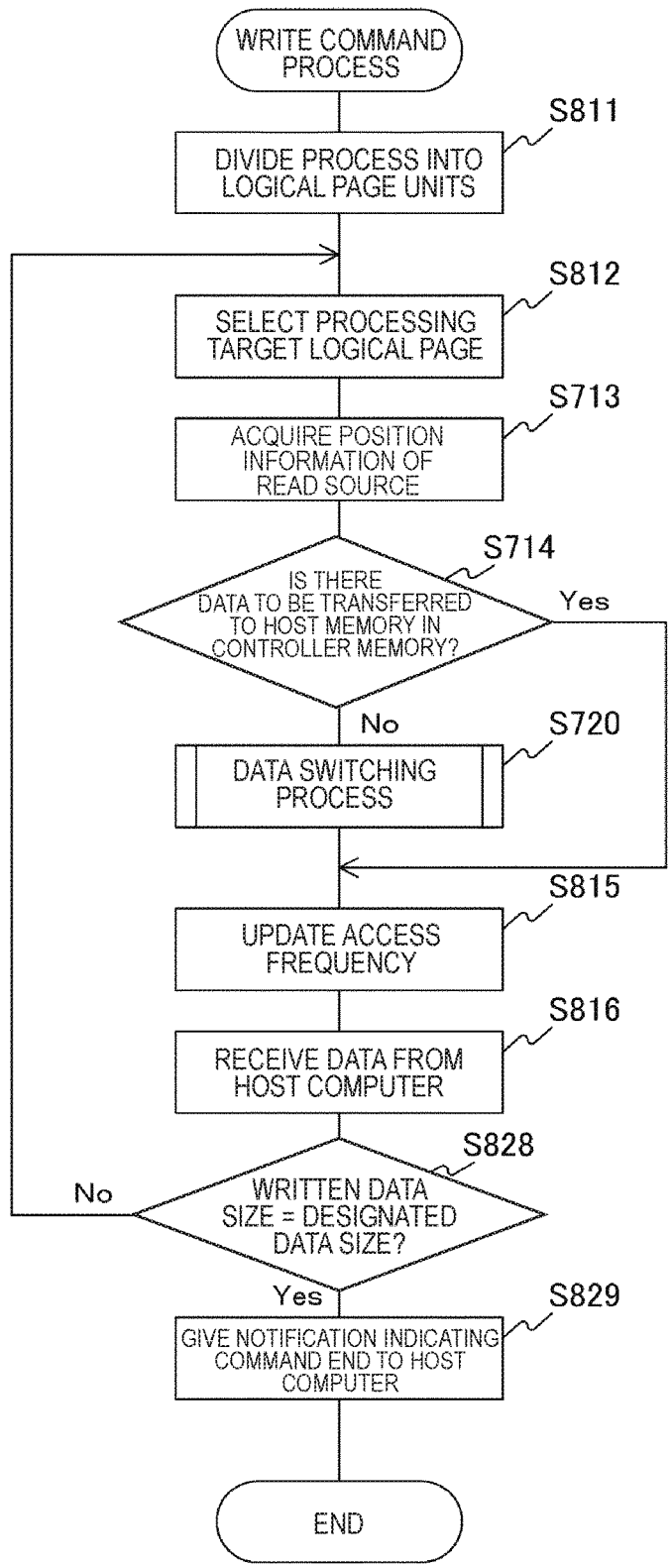

MEMORY CONTROLLER, INFORMATION PROCESSING SYSTEM, AND MEMORY EXTENSION AREA MANAGEMENT METHOD

TECHNICAL FIELD

The present technology relates to a memory controller which controls a storage device. More particularly, the present technology relates to a memory controller, a storage device, and an information processing system which are capable of storing data on a memory of a host computer, a processing method, and a program causing a computer to perform the method.

BACKGROUND ART

In an information processing system including a host computer and a storage device, a technique of securing an area used by a memory controller of a storage device on a memory of a host computer and storing data in the area is known. For example, a semiconductor storage device that reduces a capacity of a buffer on a controller side by securing and using an area for storing a copy of an address translation table in a main memory of a host has been proposed (for example, see Pattern Literature 1).

CITATION LIST

Patent Literature

Patent Literature 1: JP 2013-033337A

DISCLOSURE OF INVENTION

Technical Problem

In the above-mentioned related art, it is possible to secure the area used by the memory controller on the memory of the host computer and store data in the area (this area is hereinafter referred to as a "memory extension area"). However, since the memory extension area is secured by a use declaration by the host, it is difficult for the controller to manage the size or the like.

The present technology was made in light of the foregoing, and it is an object of the present technology to secure flexibility of the memory extension area which is secured on the memory of the host computer and used by the memory controller.

Solution to Problem

The present technology has been made to solve the above problem. According to a first aspect of the present technology, there is provided a memory controller including: a controller memory configured to store data corresponding to an area allocated to a memory in the memory controller configured to control the memory; an access control unit configured to allocate a partial area of the controller memory to a host memory in a host computer and use the area as a memory extension area; and an extension area managing unit configured to perform management in which a size of the memory extension area in the host memory is changeable. Accordingly, an operation in which the memory extension area allocated to host memory is managed to be changeable is obtained.

In addition, according to the first aspect, the extension area managing unit may check the size of the memory extension area in the host memory acquired in the host computer and transmit information indicating whether or not the size satisfies a condition to the host computer. Accordingly, an operation in which the size of the memory extension area is managed is obtained.

In addition, according to the first aspect, the extension area managing unit may release at least a part of the memory extension area in the host memory in response to a request from the host computer and give a notification of an address of the released memory extension area to the host computer. Accordingly, an operation in which the memory extension area secured in the host memory is released is obtained.

In addition, according to the first aspect, the extension area managing unit may save content stored in the memory extension area of the host memory in the memory in response to a request from the host computer. Accordingly, an operation in which content stored in the memory extension area in the host memory is saved in the memory is obtained.

In addition, according to the first aspect, the extension area managing unit may manage a status of access to the memory extension area and notify the host computer of the status of the access in response to a request from the host computer. Accordingly, an operation in which a notification of a status of access to the memory extension area is given to the host computer is obtained.

In addition, according to the first aspect, the memory controller may further includes a parameter managing unit configured to manage a parameter including a size which is capable of being dealt with as the memory extension area in the host memory and notify the host computer of the parameter in response to a request from the host computer. Accordingly, an operation in which the parameter of the memory extension area is managed and reported to the host computer is obtained.

In addition, according to the first aspect, the memory extension area may store an address translation table indicating a correspondence relation between a logical address in the host computer and a physical address in the memory. Accordingly, an operation in which the address translation table is stored in the memory extension area is obtained.

In addition, according to the first aspect, the memory extension area may store an error correcting code used for performing error correction on data stored in the memory. Accordingly, an operation in which the error correcting code is stored in the memory extension area is obtained.

In addition, according to the first aspect, the memory extension area may store data exchanged between the host computer and the memory controller. Accordingly, an operation in which data is stored in the memory extension area is obtained.

In addition, according to a second aspect of the present technology, there is provided an information processing system including: a memory; a host computer; a controller memory configured to store data corresponding to an area allocated to the memory in a memory controller configured to control the memory; an access control unit configured to allocate a partial area of the controller memory to a host memory in the host computer and use the area as a memory extension area; and an extension area managing unit configured to perform management in which a size of the memory extension area in the host memory is changeable. Accordingly, an operation in which the memory extension area allocated to the host memory is managed so that it is changeable in the memory controller is obtained.

In addition, according to a third aspect of the present technology, there is provided a memory extension area management method in a memory controller including a controller memory configured to store data corresponding to an area allocated to a memory in the memory controller configured to control the memory, an access control unit configured to allocate a partial area of the controller memory to a host memory in a host computer and use the area as a memory extension area, and an extension area managing unit configured to perform management in which a size of the memory extension area in the host memory is changeable, the memory extension area management method including: a process of receiving an area acquisition notification including an acquisition size acquired as the memory extension area from the host computer; a process of calculating a total size secured as the memory extension area on a basis of the acquisition size; and a process of transmitting a response indicating normal to the host computer when the total size satisfies a predetermined condition. Accordingly, an operation in which, when the total size secured as the memory extension area satisfies a predetermined condition, the response indicating normal is transmitted to the host computer is obtained.

Advantageous Effects of Invention

According to the present technology, an excellent effect that it is possible to secure flexibility of the memory extension area which is secured on the memory of the host computer and used by the memory controller is obtained. Note that effects described herein are not necessarily limitative, and any effect described in the present disclosure may be admitted.

BRIEF DESCRIPTION OF DRAWINGS

FIG. 10 is a diagram illustrating a field configuration example of a memory extension area management table 221 according to the first embodiment of the present technology.

FIG. 11 is a diagram illustrating a field configuration example of address translation table block position information 222 according to an embodiment of the present technology.

FIG. 12 is a diagram illustrating a field configuration example of an address translation table access frequency information table 223 according to an embodiment of the present technology.

FIG. 32 is a diagram illustrating a field configuration example of an unallocated memory extension area management table 227 according to an embodiment of the present technology.

FIG. 34 is a diagram illustrating a field configuration example of a memory extension area management table 221 according to the second embodiment of the present technology.

FIG. 37 is a diagram illustrating a field configuration example of a memory extension area management table 221 according to a third embodiment of the present technology.

FIG. 38 is a diagram illustrating a field configuration example of data block position information 252 according to the third embodiment of the present technology.

FIG. 39 is a diagram illustrating a field configuration example of a data block access frequency information table 253 according to the third embodiment of the present technology.

FIG. 43 is a flowchart illustrating a procedure example of a write command process by a command execution task of the memory controller 200 according to the third embodiment of the present technology.

MODE(S) FOR CARRYING OUT THE INVENTION

Hereinafter, modes of carrying out the present technology (hereinafter referred to as "embodiments") will be described. The description will proceed in the following order.

1. First embodiment (example of storing address translation table in memory extension area)
2. Second embodiment (example of storing error correcting code in memory extension area)
3. Third embodiment (example of using memory extension area as data cache)

<1. First Embodiment>

[Configuration of Information Processing System]

Figure 1:
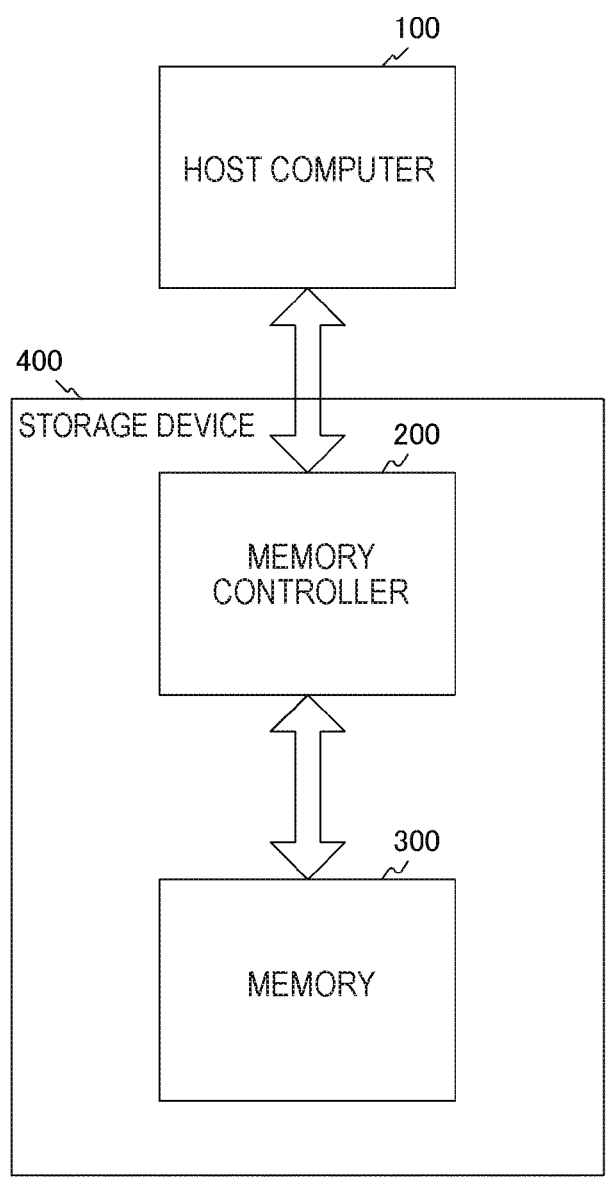
FIG. 1 is a diagram illustrating an overall configuration example of an information processing system according to an embodiment of the present technology.

FIG. 1 is a diagram illustrating an overall configuration example of an information processing system according to an embodiment of the present technology. The information processing system is configured with a host computer 100, a memory controller 200, and a memory 300. The memory controller 200 and the memory 300 constitute a storage device 400.

The host computer 100 issues a command of requesting a read process, a write process, a refresh process, or the like of data to the memory 300.

The memory controller 200 communicates with the host computer 100 to receive the command, and performs writing of data to the memory 300 and reading of data from the memory 300. Upon receiving the write command, the memory controller 200 gives an instruction to write the data received from the host computer 100 to the memory 300. Further, upon receiving the read command, the memory controller 200 reads data from the memory 300 and transfers the data to the host computer 100. Further, upon receiving the refresh command, the memory controller 200 reads data from the memory 300 and gives an instruction to rewrite the read data to the memory 300.

Figure 2:
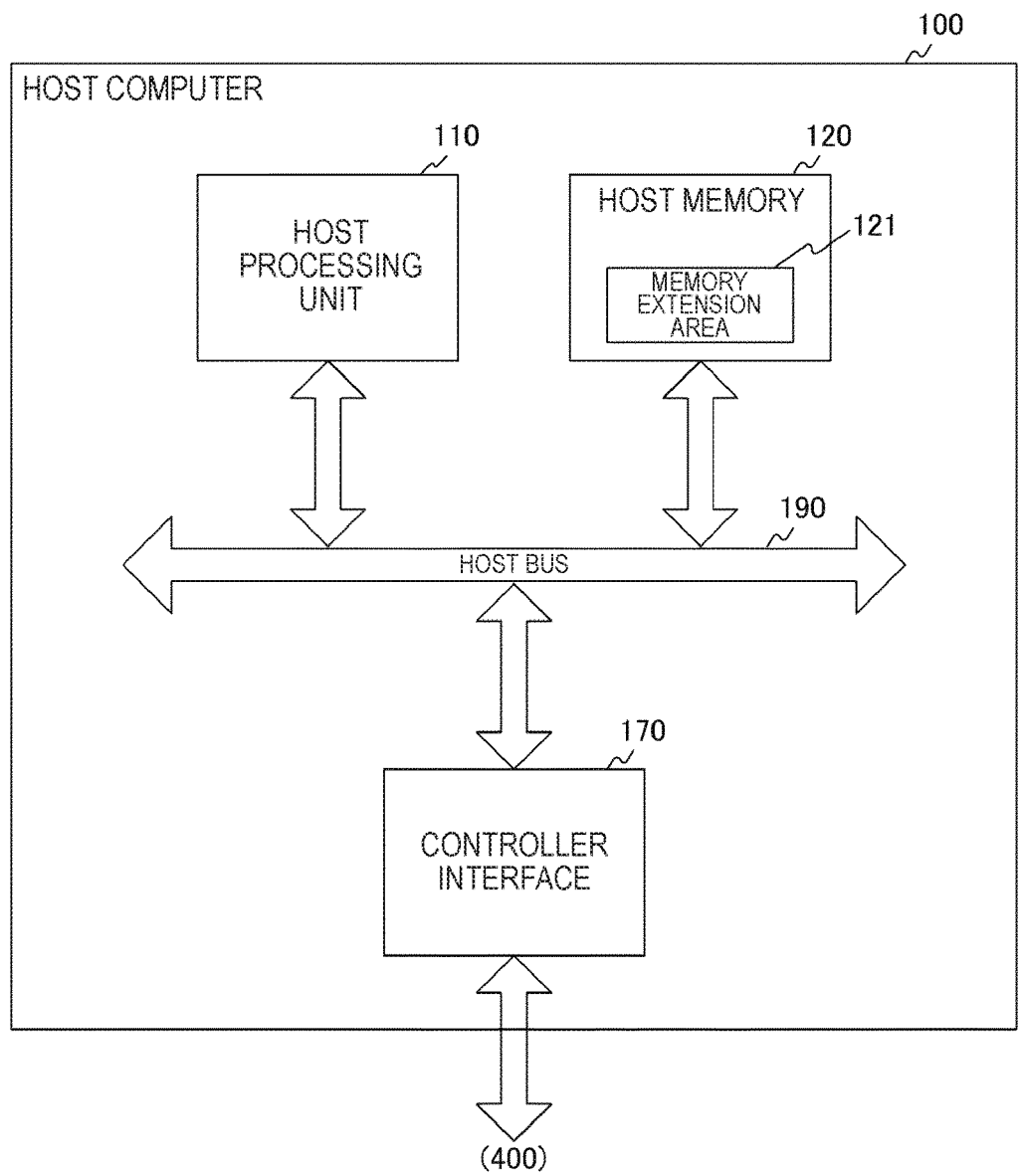
FIG. 2 is a diagram illustrating a configuration example of a host computer 100 according to an embodiment of the present technology.

FIG. 2 is a diagram illustrating a configuration example of the host computer 100 according to the embodiment of the present technology. The host computer 100 includes a host processing unit 110, a host memory 120, and a controller interface 170. The components are connected to one another via a host bus 190.

The host processing unit 110 performs overall control of the host computer 100. The host processing unit 110 executes software stored in the host memory 120. The host processing unit 110 operates using the host memory 120 as a code area and a data area.

The host memory 120 is a memory that stores the code area and the data area of the software executed by the host processing unit 110. Further, a memory extension area 121 is secured in the host memory 120 as an area usable by the memory controller 200 when the memory controller 200 is activated.

The controller interface 170 is an interface that performs communication with the memory controller 200. The controller interface 170 is connected to the memory controller 200, and performs transmission of the command to the memory controller 200 and reception and transmission of data with the memory controller 200.

Figure 3:
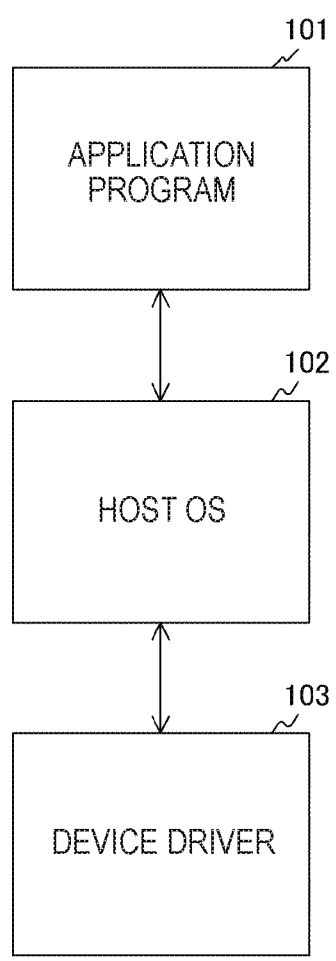
FIG. 3 is a diagram illustrating an example of a hierarchical structure of software operating on the host computer 100 according to an embodiment of the present technology.

FIG. 3 is a diagram illustrating an example of a hierarchical structure of software operating on the host computer 100 according to the embodiment of the present technology. Here, an application program 101, a host OS 102, and a device driver 103 are assumed from an upper layer of the software.

The application program 101 is software of the highest layer. The application program 101 instructs the host OS 102 to read data from the memory 300 or to write data from the memory 300, and receives a response from the host OS 102.

The host OS 102 is an operating system (OS) which functions as a bridge between the application program 101 and the device driver 103. The host OS 102 instructs the device driver 103 to read data from the memory 300 or to write data from the memory 300, and receives a response from the device driver 103. Further, the host OS 102 receives an acquisition request for the memory extension area 121 from the device driver 103, and transmits a memory area usable as the memory extension area 121 to the device driver 103 as a response.

The device driver 103 is software that controls hardware. The device driver 103 instructs the memory controller 200 to read data from the memory 300 or to write data from the memory 300, and receives a response from the memory controller 200. Further, the device driver 103 requests the host OS 102 to acquire the memory extension area 121, and receives the memory area usable as the memory extension area 121 from the host OS 102 as a response.

Figure 4:
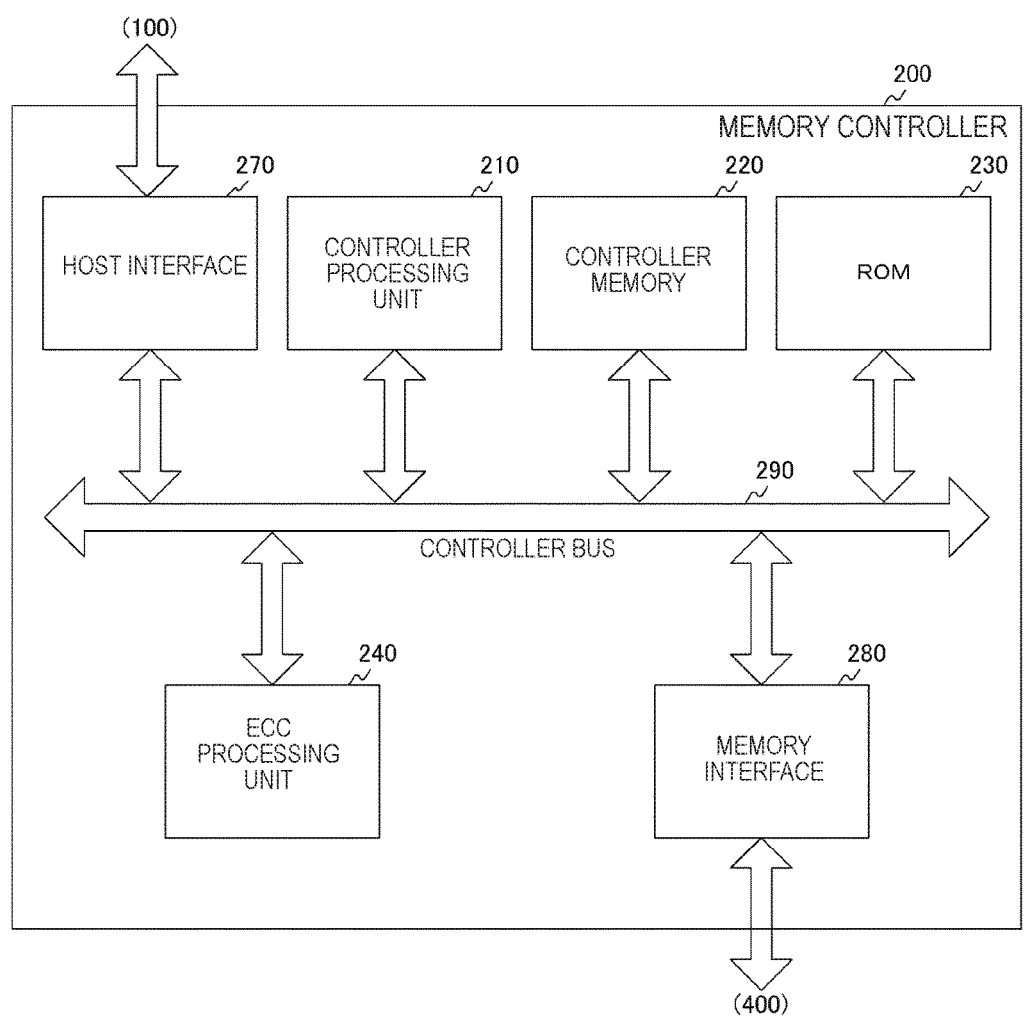
FIG. 4 is a diagram illustrating a configuration example of a memory controller 200 according to a first embodiment of the present technology.

FIG. 4 is a diagram illustrating a configuration example of the memory controller 200 according to a first embodiment of the present technology. The memory controller 200 includes a controller processing unit 210, a controller memory 220, a ROM 230, an ECC processing unit 240, a host interface 270, and a memory interface 280. The components are connected to one another via a controller bus 290.

The controller processing unit 210 performs overall control of the memory controller 200. The controller processing unit 210 executes the software stored in the controller memory 220. The controller processing unit 210 operates using the controller memory 220 as a code area and a data area.

The controller memory 220 is a memory that stores the code area and the data area of the software executed by the controller processing unit 210. The controller memory 220 is also used as an area for expanding a table for managing user data. The table will be described later in detail.

The ROM 230 is a read only memory that stores a parameter of a memory extension function in the memory controller 200.

The ECC processing unit 240 generates an error correcting code (ECC) of data to be stored in the memory 300 and performs an error correction process for data read from the memory 300.

The host interface 270 is an interface that performs communication with the host computer 100. The memory interface 280 is an interface that performs communication with the memory 300.

A control task, a command execution task, and a memory extension area management task operate on the controller processing unit 210. In the control task, when a command is received from the host computer 100, the command is decoded. Then, in the case of the read command to read data from the memory 300 or the write command to write data to the memory 300, the command execution task is called to perform a corresponding process. If a command relates to the memory extension area 121, the memory extension area management task is called to perform a corresponding process.

Figure 5:
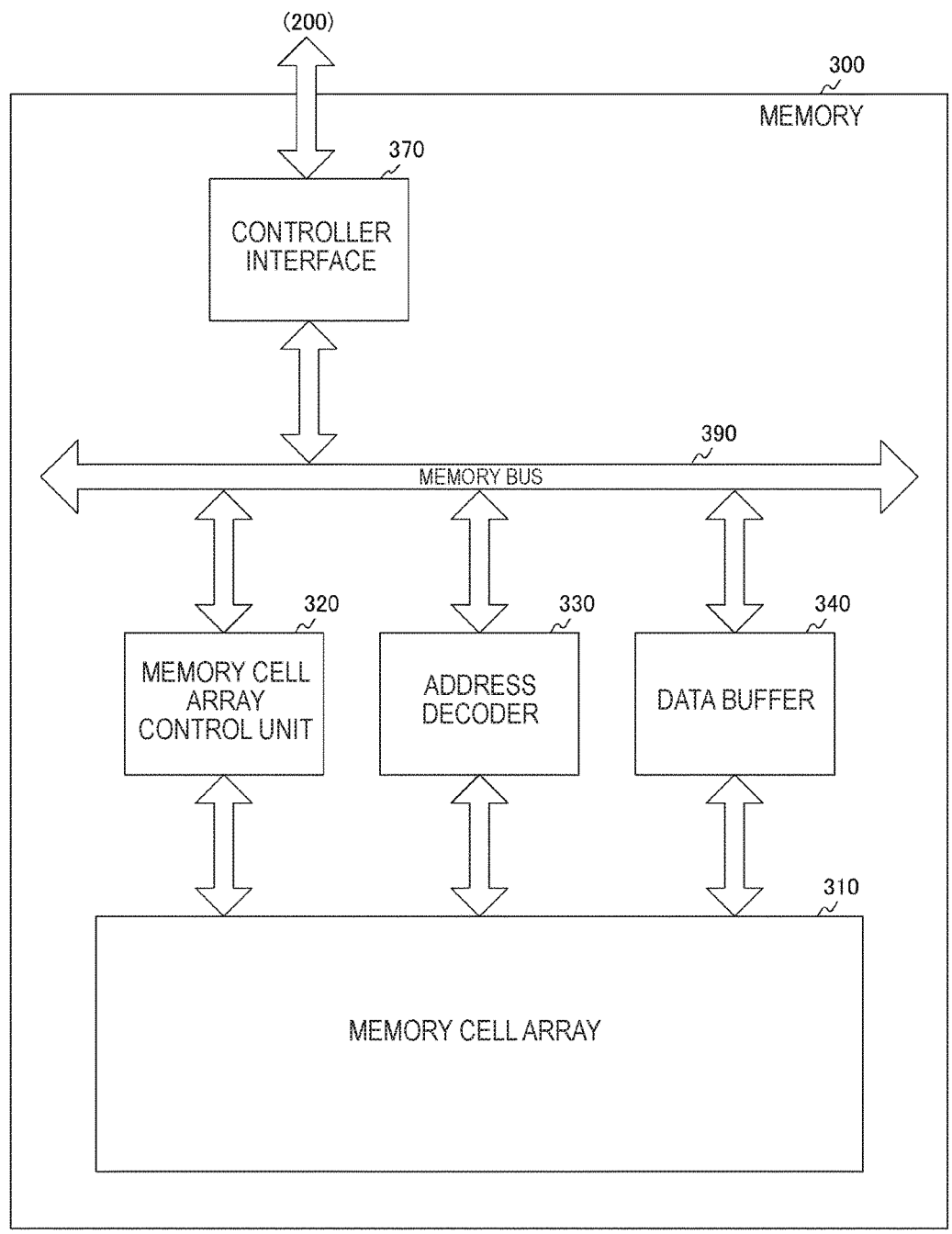
FIG. 5 is a diagram illustrating a configuration example of a memory 300 according to an embodiment of the present technology.

FIG. 5 is a diagram illustrating a configuration example of the memory 300 according to the embodiment of the present technology. The memory 300 includes a memory cell array 310, a memory cell array control unit 320, an address decoder 330, a data buffer 340, and a controller interface 370. The memory cell array control unit 320, the address decoder 330, and the data buffer 340 are connected to the memory cell array 310 and also connected to the controller interface 370 via a memory bus 390.

The memory cell array 310 is a storage element in which memory cells storing data are integrated in an array form. The memory cell array control unit 320 performs control on the memory cell array 310. The address decoder 330 is a decoder that decodes an address for the memory cell array 310. The data buffer 340 is a buffer for accessing the memory cell array 310. The controller interface 370 is an interface that performs communication with the memory controller 200.

[Storage Area of Memory]

Figure 6:
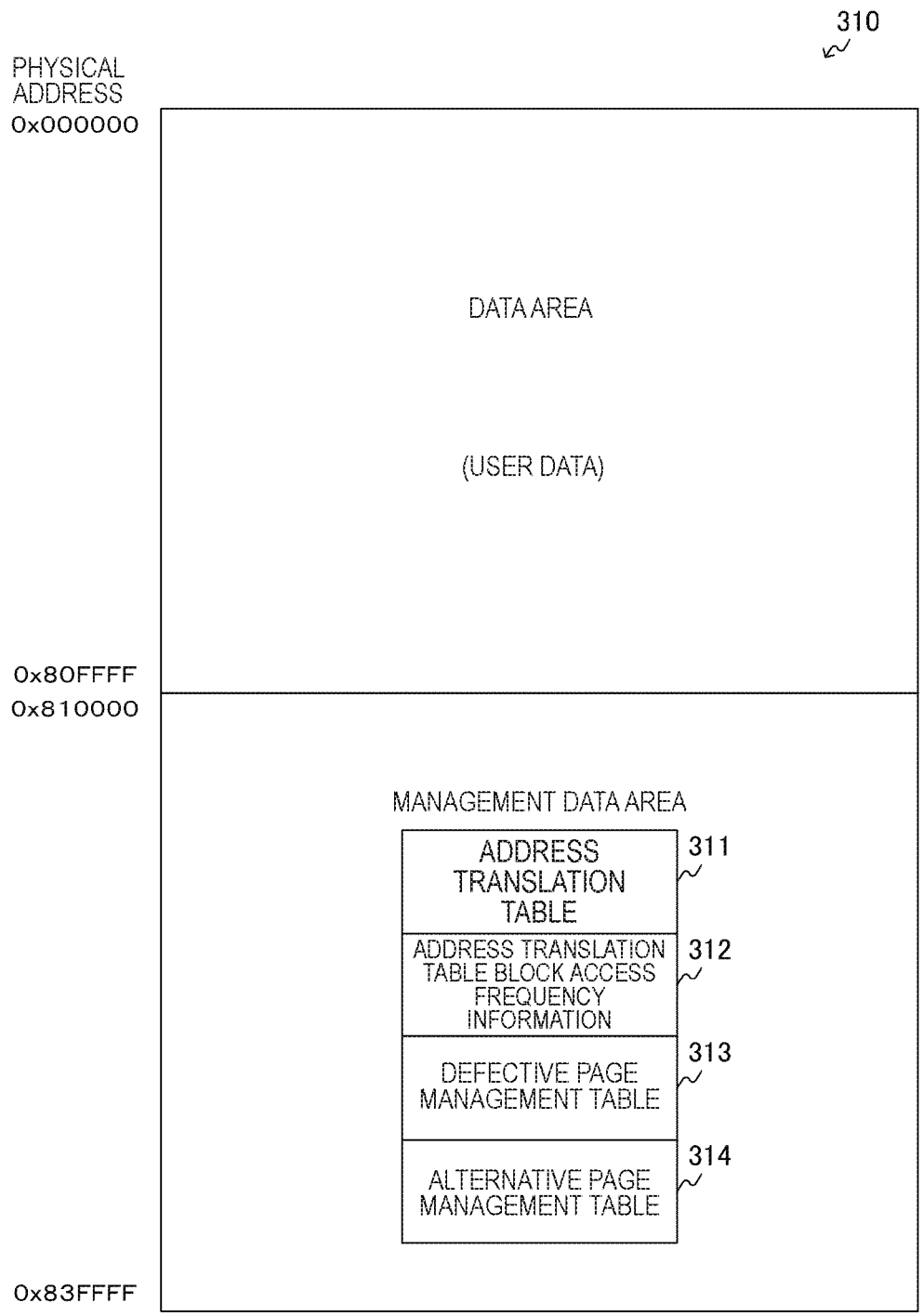
FIG. 6 is a diagram illustrating an example of a storage area of a memory cell array 310 according to an embodiment of the present technology.

FIG. 6 is a diagram illustrating an example of a storage area of the memory cell array 310 according to the embodiment of the present technology.

An area from a physical addresses 0x000000 (a number following "0x" is hexadecimal number; the same hereinafter)) to 0x80FFFF is a data area, and data transferred in accordance with the write command is recorded from the host computer 100. An area from the physical addresses 0x810000 to 0x83FFFF is a management data area, and a table for managing the data of the user area used by the memory controller 200 is recorded.

As the table for managing the user data, an address translation table 311, address translation table block access frequency information 312, a defective page management table 313, and an alternative page management table 314 are included. The address translation table 311 is a table for translating a logical address into a physical address. The address translation table block access frequency information 312 holds an access frequency for the address translation table 311 for each block. The defective page management table 313 is a table for recording the physical address of the memory 300 at which data is unable to be written or read due to a failure, a defect, or the like. The alternative page management table 314 is a table for managing an alternative page.

Figure 7:
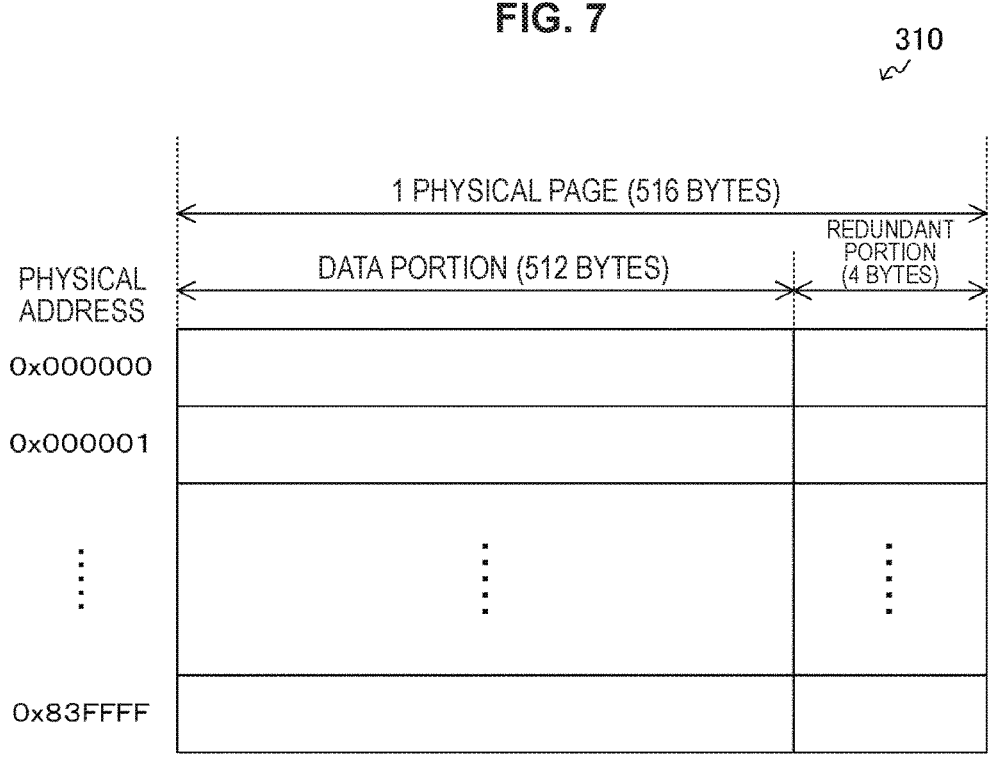
FIG. 7 is a diagram illustrating an example of a page configuration of a memory cell array 310 according to an embodiment of the present technology.

FIG. 7 is a diagram illustrating an example of a page configuration of the memory cell array 310 according to the embodiment of the present technology.

The physical address is allocated to the memory cell array 310 in units of physical pages of 516 bytes. Writing to the memory 300 and reading from the memory 300 are performed in units of physical pages.

Data to be written in one physical page is configured with data of 512 bytes and a redundant portion attached to the data. In this example, the redundant portion is a 4-byte ECC.

Figure 8:
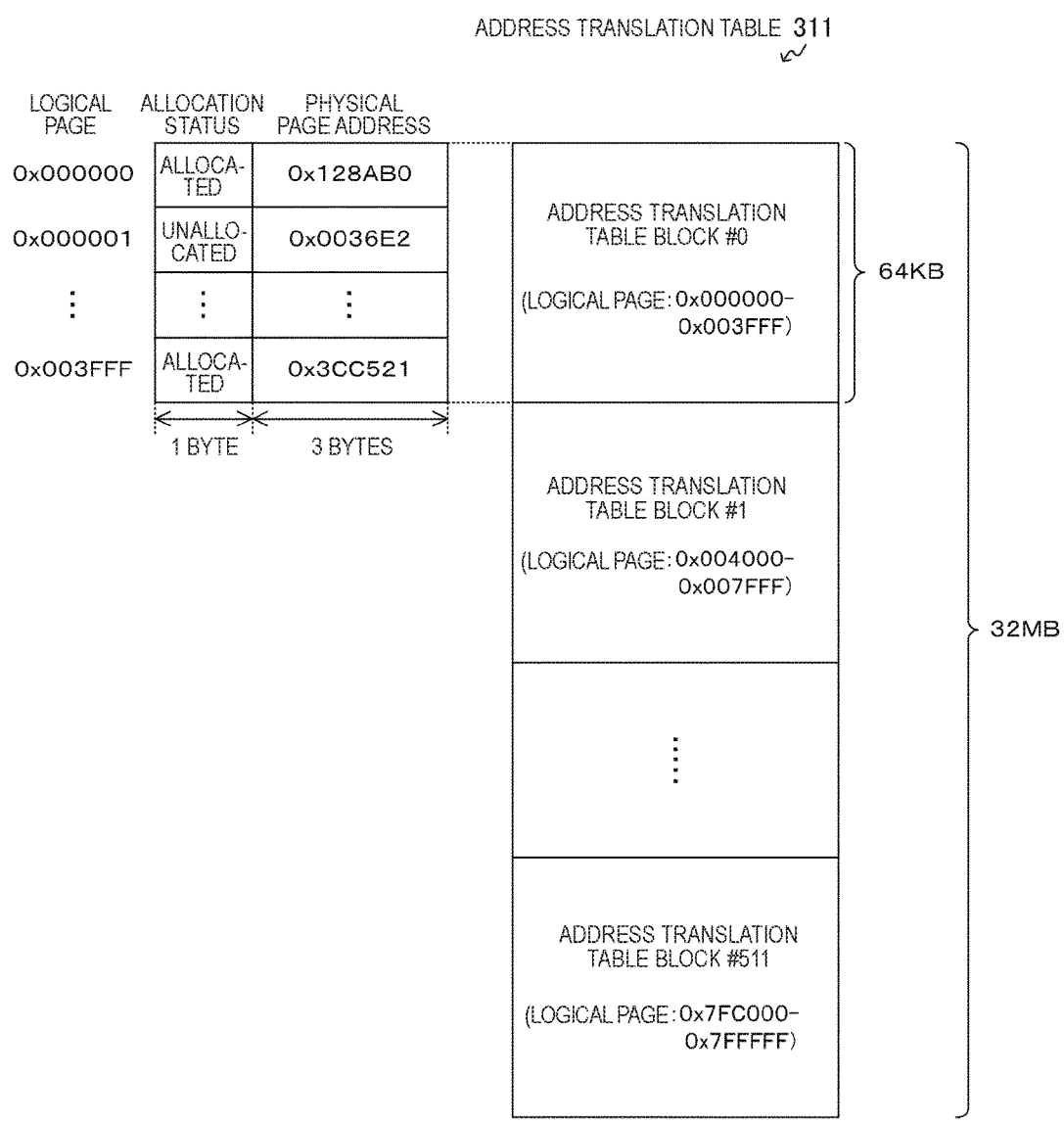
FIG. 8 is a diagram illustrating an example of a configuration of an address translation table 311 according to an embodiment of the present technology.

FIG. 8 is a diagram illustrating an example of a configuration of the address translation table 311 according to the embodiment of the present technology.

The application program 101 or the host OS 102 operating in the host processing unit 110 of the host computer 100 uses a logical address to indicate position information of data when giving an instruction to read data from or write data to the memory 300. On the other hand, the memory controller 200 uses a physical address to indicate position information of data when requesting reading of data from or writing of data to the memory 300.

The memory controller 200 includes the address translation table 311 for translating a logical address into a physical address and translates a logical address received from the host computer 100 into a physical address using the address translation table 311. Then, the memory controller 200 gives an instruction to read or write data from or to the memory 300 using the physical address. By using the address translation table 311, the memory controller 200 performs a process for eliminating a physical page in which a write failure has occurred and a process for leveling the number of rewrites of data.

A data size of a logical page is 512 B (bytes), and one physical page is allocated to one logical page. In the address translation table 311, an "allocation status" of 1 byte indicating whether or not a physical page is allocated and 3-byte information indicating an allocated "physical page address" are held for each logical page. When the "allocation status" indicates "allocated," a value of the allocated physical page address is valid, and when the "allocation status" indicates "unallocated," a value of the allocated physical page address is invalid.

A unit in which the memory controller 200 reads the address translation table 311 from the memory 300 and writes the address translation table 311 to the memory 300 is referred to as an "address translation table block." One address translation table block is 64 KB, and an "allocation status" and a "physical page address" of 16348 pages are stored.

Since a total data size which can be recorded in the memory 300 by the application program 101 or host OS 102 is 4 GB, a total of the number of address translation table blocks is 512 blocks, and a total size is 32 MB.

[Table Group Held in Controller Memory]

Figure 9:
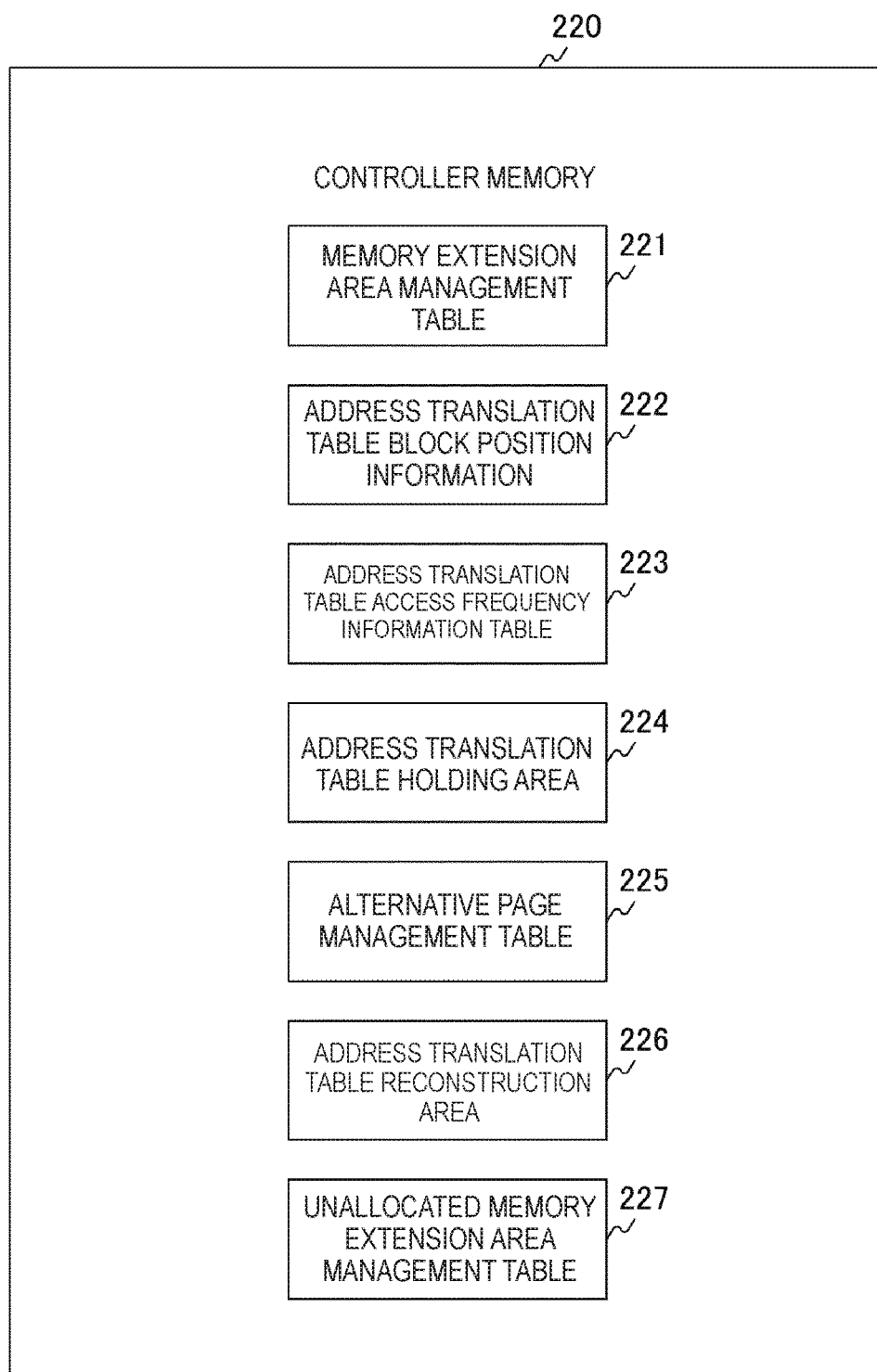
FIG. 9 is a diagram illustrating an example of a table group held in a controller memory 220 according to an embodiment of the present technology.

FIG. 9 is a diagram illustrating an example of a table group held in the controller memory 220 according to the embodiment of the present technology. Here, a memory extension area management table 221, address translation table block position information 222, and an address translation table access frequency information table 223 are illustrated as a table groups held in the controller memory 220. Further, an address translation table holding area 224, an alternative page management table 225, an address translation table reconstruction area 226, and an unallocated memory extension area management table 227 are illustrated.

The memory extension area management table 221 is a table for managing a use status of the memory extension area 121. The address translation table block position information 222 is a table indicating a storage position of each address translation table block of the address translation table 311. The address translation table access frequency information table 223 is a table indicating an access frequency for each address translation table block of the address translation table 311. The address translation table holding area 224 is an area for holding a copy of the address translation table 311 on the memory 300 in the controller memory 220.

The alternative page management table 225 is a table for holding a list of addresses of physical pages that are not allocated to logical addresses. In order to acquire an unused page address from the alternative page management table 225, an address value is acquired in order from the smallest value.

The address translation table reconstruction area 226 is an area for reconstructing a copy of the address translation table 311 which has failed in integrity check on the controller memory 220. The unallocated memory extension area management table 227 is a table for holding an address of a memory area which is not used by the memory controller 200 while being reported from the device driver 103 as a memory area usable as the memory extension area 121.

FIG. 10 is a diagram illustrating a field configuration example of the memory extension area management table 221 according to the first embodiment of the present technology. The memory extension area management table 221 includes fields such as an "index number," a "use status," a "division number," a "start address," and a "size."

The "index number" is a number allocated to an index obtained by dividing the memory extension area 121 by 16. The memory controller 200 accesses the memory extension area 121 using the index as a management unit. In this embodiment, the management unit is set to 32 KB.

The "use status" is a field indicating whether or not valid data is placed in the memory extension area 121 secured in the host memory 120 for each management unit. When the "use status" indicates "in use," it means that valid data is placed in the memory extension area 121, and when the "use status" indicates "unused," it means that valid data is not placed in the memory extension area 121.

The "division number" is a field indicating the number of further divisions in the physical address space of the host memory 120 in the management unit of the memory extension area 121. When consecutive physical addresses are secured, "1" is indicated as the "division number."

The "start address" is a field indicating a start address of an area usable as the memory extension area 121 corresponding to the corresponding index using a physical address. The "size" is a field indicating a size of an area usable as the memory extension area 121 corresponding to the corresponding index. For each index, "start addresses" and "sizes" which are equal in number to a value indicated by the "division number" are held.

FIG. 11 is a diagram illustrating a field configuration example of the address translation table block position information 222 according to the embodiment of the present technology. The address translation table block position information 222 includes fields such as an "address translation table block number," "latest data," a "controller memory index number," and a "memory extension area index number."

The "address translation table block number" is a field indicating a number of the address translation table block of the address translation table 311.

The "latest data" is a field indicating a memory in which data of the latest address translation table block is held. As a target memory, any one of a "host memory," a "controller memory," and a "memory" is indicated.

The "controller memory index number" is a field indicating a number of an index held in the controller memory 220 when data of the address translation table block is held in the controller memory 220. In this embodiment, since one piece of data is assumed as data of the address translation table block held in the controller memory 220, "0x00" is indicated. On the other hand, "0xFF" indicates an invalid value.

The "memory extension area index number" is a field indicating a number of an index held in the memory extension area 121 when data of the address translation table block is held in the memory extension area 121.

FIG. 12 is a diagram illustrating a field configuration example of the address translation table access frequency information table 223 according to the embodiment of the present technology. The address translation table access frequency information table 223 includes fields such as an "address translation table block number" and an "access frequency."

The "address translation table block number" is a field indicating a number of the address translation table block of the address translation table 311.

The "access frequency" is a field indicating the number of accesses to the block. The "access frequency" is incremented when writing or reading is performed on a logical address included in the corresponding address translation table block.

[Functional Configuration of Information Processing System]

Figure 13:
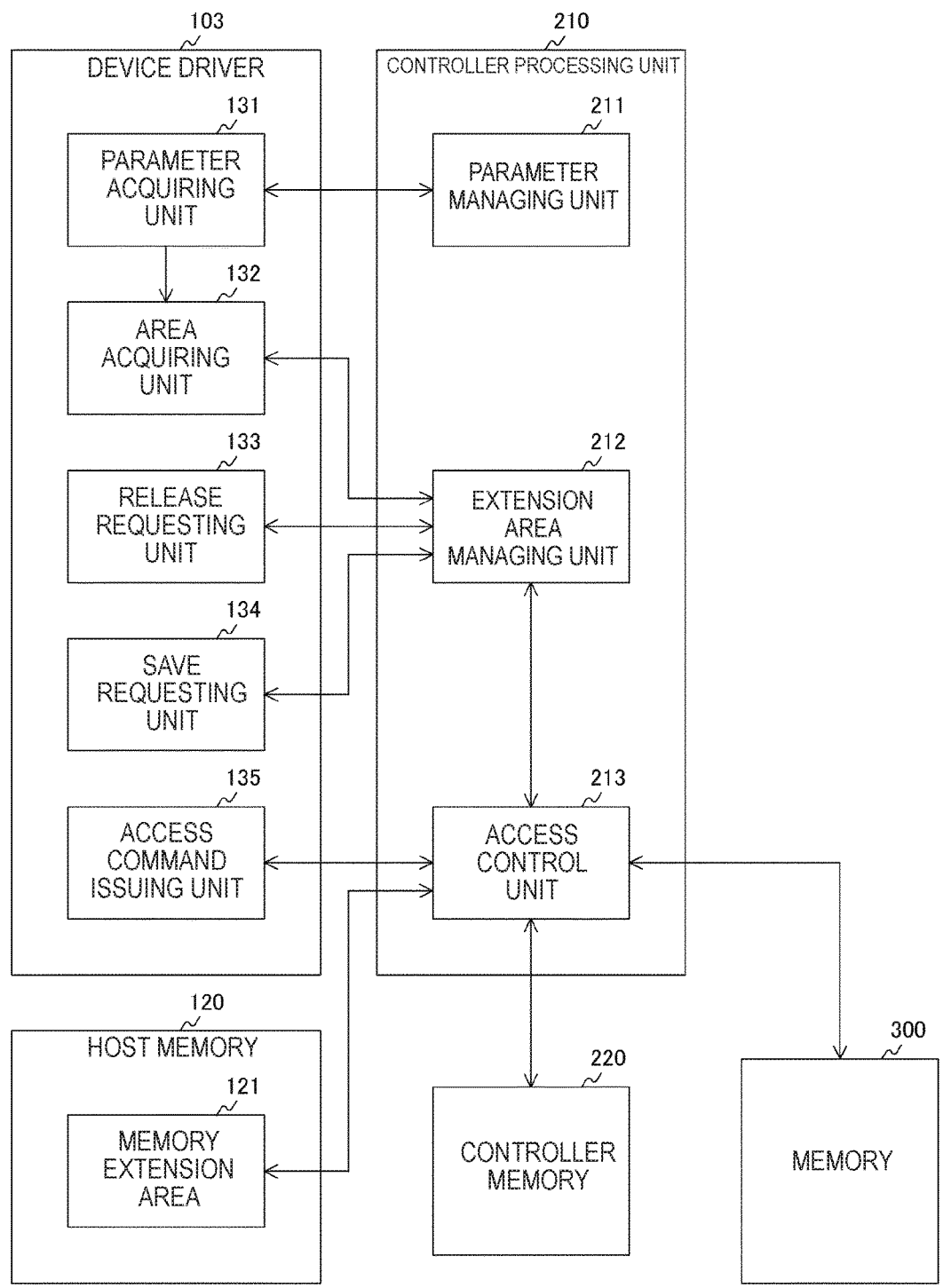
FIG. 13 is a diagram illustrating a functional configuration example of an information processing system according to an embodiment of the present technology.

FIG. 13 is a diagram illustrating a functional configuration example of the information processing system according to the embodiment of the present technology. The memory controller 200 reads data corresponding to an area allocated to the memory cell array 310 of the memory 300 and stores the read data in the controller memory 220. The memory controller 200 allocates some of the data stored in the controller memory 220 to the host memory 120 of the host computer 100 and uses it as the memory extension area 121.

Here, a functional configuration of the controller processing unit 210 includes a parameter managing unit 211, an extension area managing unit 212, and an access control unit 213. Further, a functional configuration of the device driver 103 includes a parameter acquiring unit 131, an area acquiring unit 132, a release requesting unit 133, a save requesting unit 134, and an access command issuing unit 135.

The parameter managing unit 211 manages parameters of the memory extension area 121. In response to a request from the host computer 100, the parameter managing unit 211 notifies the host computer 100 of the parameters of the memory extension area 121. Here, for example, the presence/absence of correspondence to the memory extension function of the memory controller 200 and a maximum size Mmax, a minimum size Mmin, and an additional acquisition unit Munit of the memory extension area 121 that can be dealt with in the memory controller 200 are assumed as the parameters. The additional acquisition unit Munit is a unit in which the host computer 100 additionally secures the memory extension area 121 in the host memory 120. The area which is secured additionally is a multiple of the additional acquisition unit Munit which is n×Munit (n is an integer). In this case, the maximum size Mmax is assumed to be 32 MB, the minimum size Mmin is assumed to be 64 KB, and the additional acquisition unit Munit is assumed to be 64 KB.

The extension area managing unit 212 manages the memory extension area 121 in the host memory 120. The extension area managing unit 212 performs management such that the size of the memory extension area 121 is changeable as follows. In other words, the extension area managing unit 212 checks the size of the memory extension area 121 in the host memory 120 acquired in the host computer 100. Then, information indicating whether or not the size satisfies a predetermined condition is transmitted to the host computer 100. At this time, the extension area managing unit 212 calculates a total size Msum by adding the size acquired in the host computer 100 to the size managed as the memory extension area 121. Then, it is checked that the total size Msum satisfies the following conditions:

$$M\text{min} \leq M\text{sum} \leq M\text{max}$$

$$M\text{sum} = M\text{min} + n \times M\text{unit}$$

Further, in response to a request from the host computer 100, the extension area managing unit 212 releases the memory extension area 121 in the host memory 120, and gives a notification of an address of the released memory extension area 121 to the host computer 100. Further, in response to a request from the host computer 100, the extension area managing unit 212 saves content stored in the memory extension area 121 in the host memory 120 in the memory 300. Further, the extension area managing unit 212 manages a status of access to the memory extension area 121 and notifies the host computer 100 of the access status in response to a request from the host computer 100.

The access control unit 213 performs control such that a part of the area of the host memory 120 is used as the memory extension area 121. In other words, the access control unit 213 accesses the controller memory 220, the memory 300, or the memory extension area 121 in accordance with a command issued from the host computer 100.

The parameter acquiring unit 131 transmits a query about the parameters of the memory extension area 121 to the memory controller 200 and acquires the parameters from the memory controller 200.

The area acquiring unit 132 secures a memory area in the host memory 120 in accordance with the parameters acquired in the parameter acquiring unit 131 and acquires the memory area as a memory extension area 121. The area acquiring unit 132 notifies the memory controller 200 of an acquisition result of the memory extension area 121.

The release requesting unit 133 requests the memory controller 200 to release the memory extension area 121 in the host memory 120.

The save requesting unit 134 requests the memory controller 200 to save the content stored in the memory extension area 121 in the host memory 120 in the memory 300.

The access command issuing unit 135 issues a command to request access to the controller memory 220 to the memory controller 200.

[Operation of Information Processing System]

Figure 14:
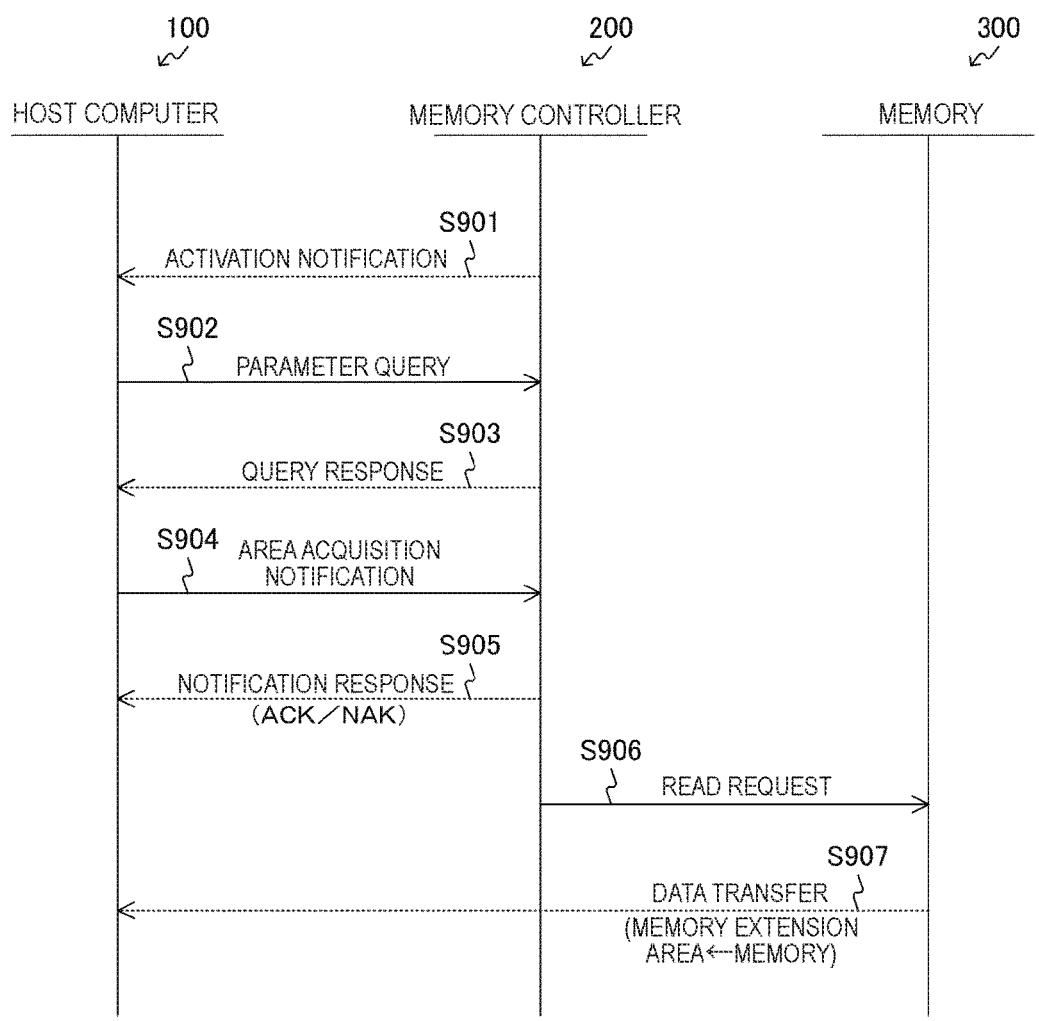
FIG. 14 is a sequence diagram illustrating an example of an initialization process of an information processing system according to an embodiment of the present technology.

FIG. 14 is a sequence diagram illustrating an example of the initialization process of the information processing system according to the embodiment of the present technology.

When activation is performed from a power-off state, the memory controller 200 gives an activation notification to the host computer 100 via the host interface 270 (step S901).

Upon receiving the activation notification from the memory controller 200, the host computer 100 issues a parameter query (Query Request) to acquire the parameters of the memory extension function supported by the memory controller 200 (step S902).

Upon receiving the parameter query; the memory controller 200 transfers the parameters of the memory extension function to the host computer 100 as a query response (Query Response) (step S903).

Upon receiving the parameters of the memory extension function, the host computer 100 acquires the memory extension area 121 when the memory extension function is confirmed to be supported. Then, a notification of the address and the size of the memory extension area 121 (Acquisition Notification) is given to the memory controller 200 (step S904).

When the size of the acquired memory extension area 121 is confirmed, the memory controller 200 that has received the area acquisition notification transmits a notification response to the host computer 100 (step S905). The notification response indicates "ACK" when the size of the memory extension area 121 satisfies the condition and "NAK" when the size of the memory extension area 121 does not satisfy the condition.

Then, the memory controller 200 transmits a read request to the memory 300 in order to transfer the data to the acquired memory extension area 121 (step S906). Accordingly, the data is read from the memory 300, and the data is transferred to the memory extension area 121 (step S907).

Figure 15:
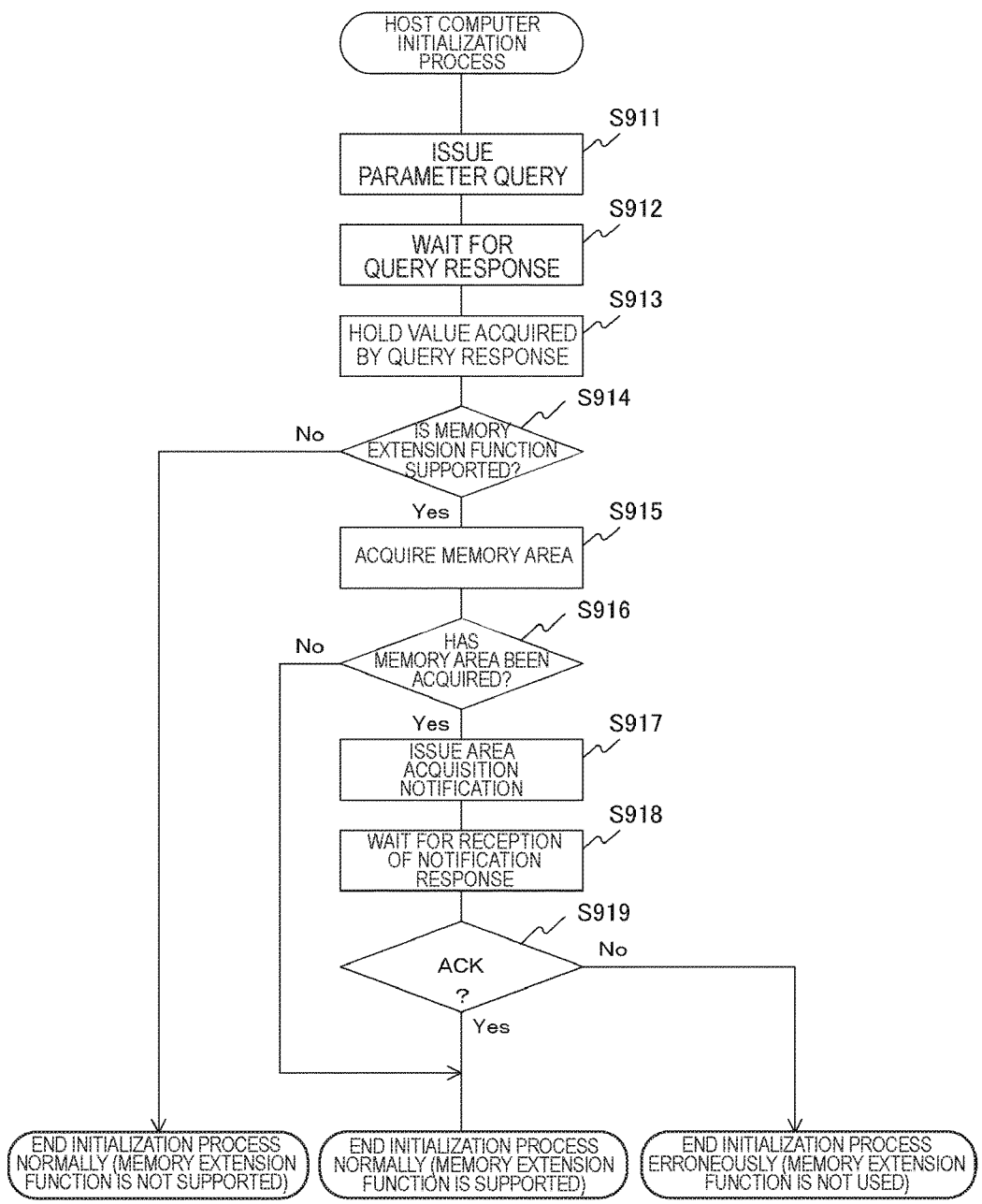
FIG. 15 is a flowchart illustrating a procedure example of an initialization process by a device driver 103 of the host computer 100 according to an embodiment of the present technology.

FIG. 15 is a flowchart illustrating a procedure example of an initialization process by the device driver 103 of the host computer 100 according to the embodiment of the present technology.

The host processing unit 110 issues a parameter query to the memory controller 200 in order to acquire the parameters of the memory extension function supported by the memory controller 200 (step S911). Thereafter, the host processing unit 110 waits for a query response from the memory controller 200 (step S912).

Upon receiving the query response from the memory controller 200, the host processing unit 110 holds the parameters of the memory extension function included in the response in the host memory 120 (step S913). The host processing unit 110 determines whether or not the memory controller 200 supports the memory extension function from information indicating support or non-support of the memory extension function among the parameters held in the host memory 120 (step S914). When the memory extension function is not supported (No in step S914), since the memory extension function is not supported, the initialization process ends normally. In this case, the host processing unit 110 does not perform an operation related to the memory extension function. On the other hand, if the memory extension function is supported (Yes in step S914), step S915 and steps subsequent thereto are performed.

The host processing unit 110 transmits a query about the size that can be acquired as the memory extension area 121 to the host OS 102. If a necessary size can be acquired, the host processing unit 110 designates an acquisition size Mget and acquires the memory extension area 121 from the host OS 102 (step S915). At this time, the size Mget to be designated needs to satisfy the following formulas.

$$Mmin \le Mget \le Mmax$$

$$Mget = Mmin + n \times Munit$$

The host processing unit 110 determines whether or not the memory extension area 121 has been successfully acquired (step S916). When the memory extension area 121 is unable to be acquired (No in step S916), the initialization process ends normally. On the other hand, when the memory extension area 121 has been acquired (Yes in step S916), step S917 and steps subsequent thereto are performed.

The host processing unit 110 notifies the memory controller 200 of an address and a size of the acquired memory extension area 121 (step S917). Then, the host processing unit 110 waits for a notification response (ACK or NAK) from the memory controller 200 (step S918). When the notification response is not ACK (No in step S919), the host processing unit 110 gives a notification indicating that that the notified area is not used to the host OS 102. In this case, the host processing unit 110 determines that a certain abnormality has occurred in a function relating to the memory extension function, and does not perform the operation related to the memory extension function. On the other hand, when the notification response is ACK (Yes in step S919), the host processing unit 110 performs an operation related to the memory extension function.

Figure 16:
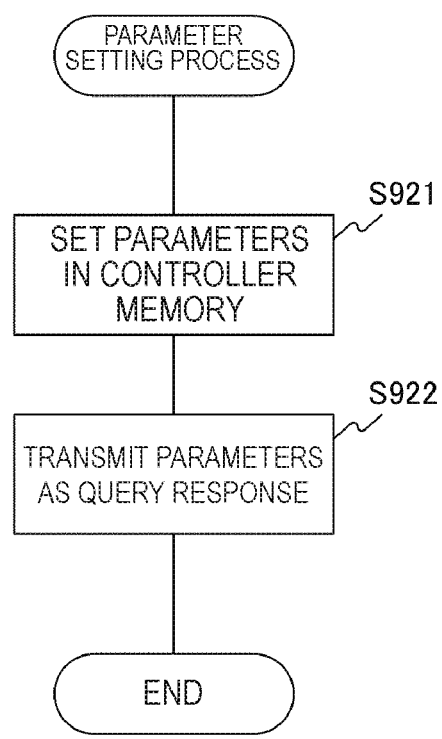
FIG. 16 is a flowchart illustrating a procedure example of a parameter setting process by a memory extension area management task of the memory controller 200 according to an embodiment of the present technology.

FIG. 16 is a flowchart illustrating a procedure example of a parameter setting process by the memory extension area management task of the memory controller 200 according to the embodiment of the present technology.

The controller processing unit 210 sets values of the parameters of the memory extension function recorded in the ROM 230 in the controller memory 220 (step S921). Then, the controller processing unit 210 transfers the values of the parameters of the memory extension function set in the controller memory 220 to the host computer 100 as a query response (step S922).

Figure 17:
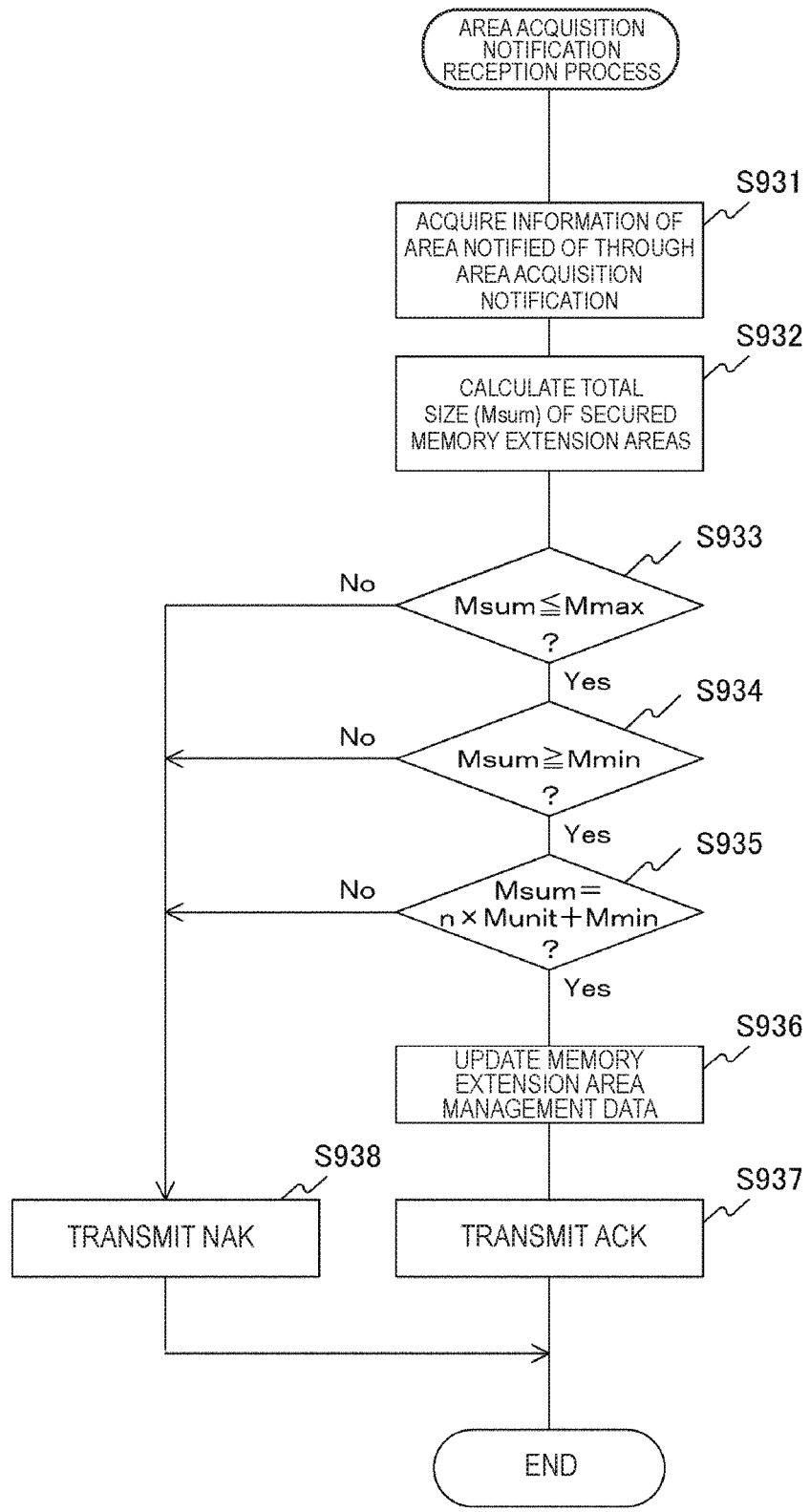
FIG. 17 is a flowchart illustrating a procedure example of an area acquisition notification reception process by a memory extension area management task of a memory controller 200 according to the embodiment of the present technology.

FIG. 17 is a flowchart illustrating a procedure example of an area acquisition notification reception process by the memory extension area management task of the memory controller 200 according to the embodiment of the present technology.

Upon receiving the area acquisition notification, the controller processing unit 210 acquires an address and a size of the memory extension area included in the area acquisition notification and holds them in the controller memory 220 (step S931).

The controller processing unit 210 calculates the total size Msum by adding the size of the memory extension area notified of through the area acquisition notification and the size of the area managed in the memory extension area management table 221 (step S932). When there is no area managed in the memory extension area management table 221, for example, when the area acquisition notification is performed for the first time after the system activation, the size of the area managed in the memory extension area management table 221 is considered to be "0."

The controller processing unit 210 compares the value of the total size Msum with the value of the maximum size Mmax of the memory extension area 121 that can be dealt with in the memory controller 200 (step S933). When the total size Msum is larger than the maximum size Mmax (No in step S933), the controller processing unit 210 transmits NAK to the host computer 100 (step S938). When the total size Msum is equal to or less than the maximum size Mmax (Yes in step S933), the process proceeds to the next step S934.

The controller processing unit 210 compares the value of the total size Msum with the value of the minimum size Mmin of the memory extension area 121 that can be dealt with in the memory controller 200 (step S934). When the total size Msum is smaller than the minimum size Mmin (No in step S934), the controller processing unit 210 transmits NAK to the host computer 100 (step S938). When the total size Msum is equal to or larger than the minimum size Mmin (Yes in step S934), the process proceeds to the next step S935.

The controller processing unit 210 determines whether or not the value of the total size Msum is a value obtained by adding the minimum size Mmin to a multiple of the additional acquisition unit Munit (step S935). When the value of the total size Msum is not a value obtained by adding the minimum size Mmin to the multiple of the additional acquisition unit Munit (No in step S935), the controller processing unit 210 transmits NAK to the host computer 100 (step S938). When the value of the total size Msum is a value obtained by adding the minimum size Mmin to the multiple of the additional acquisition unit Munit (Yes in step S935), the process proceeds to the next step S936.

The controller processing unit 210 searches for an entry whose "use status" is "released" from the memory extension area management table 221. Then, its "use status" is updated to "unused." Then, the "start address," the "size," and the "division number" are calculated from the memory extension area 121 notified of through the area acquisition notification, and the memory extension area management table 221 is updated (step S936). Thereafter, the controller processing unit 210 transmits ACK to the host computer 100 (step S937).

Figure 18:
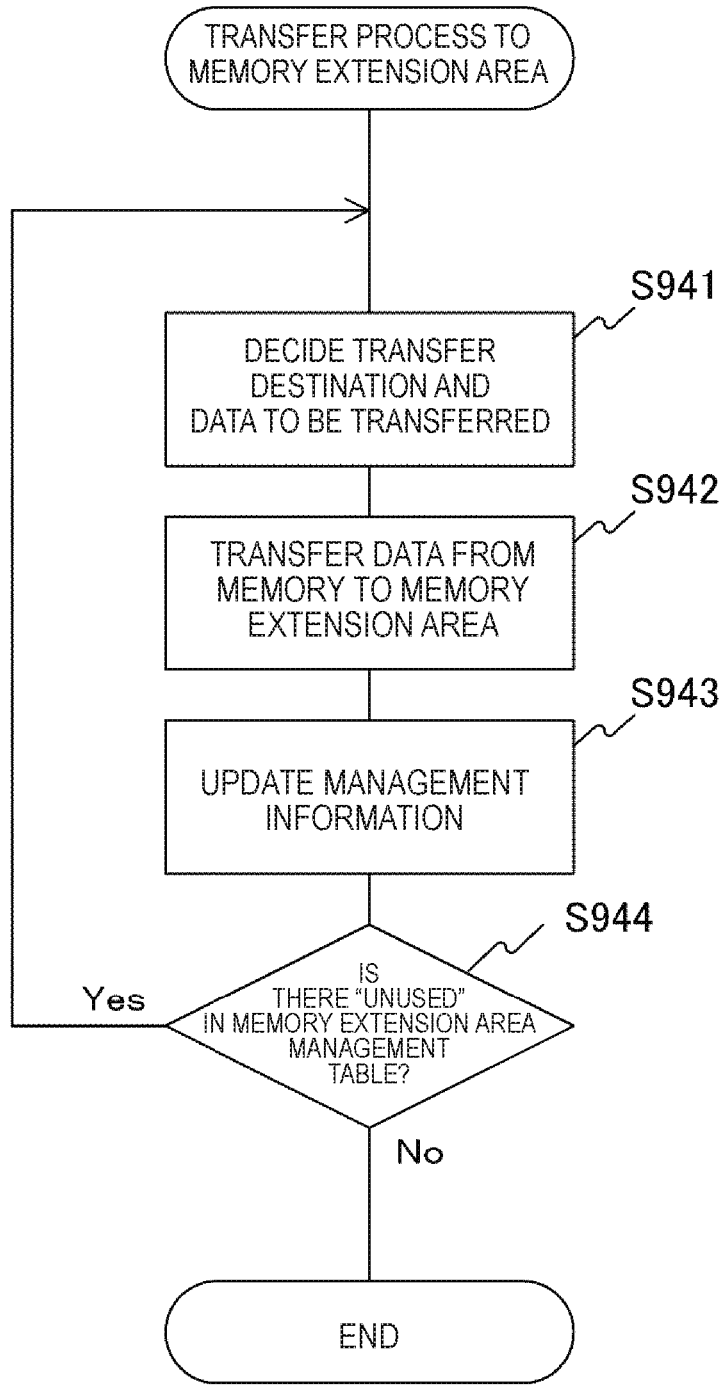
FIG. 18 is a flowchart illustrating a procedure example of a data transfer process from a memory 300 to the memory extension area 121 by a memory extension area management task of the memory controller 200 according to an embodiment of the present technology.

FIG. 18 is a flowchart illustrating a procedure example of a data transfer process from the memory 300 to the memory extension area 121 by the memory extension area management task of the memory controller 200 according to the embodiment of the present technology.

The controller processing unit 210 decides an address translation table to be transferred from the memory 300 to the memory extension area 121 of the host memory 120 (step S941). The controller processing unit 210 selects an index number whose "use status" in the memory extension area management table 221 is "unused," and selects the memory extension area 121 of the transfer destination on the basis of the "start address" and the "size." Further, the controller processing unit 210 selects the address translation table block which has a large access frequency value and has not been transferred to the host memory 120 as data to be transferred (step S941).

The controller processing unit 210 reads the address translation table block of the index number selected in step S941 from the memory 300 and transfers it to the memory extension area 121 of the host memory 120 selected in step S941 (step S942).

The controller processing unit 210 updates the memory extension area management table 221 and the address translation table block position information 222 (step S943). In other words, the "use status" of the index number of the memory extension area management table 221 designated as the transfer destination is set to "in use." Further, the memory extension area index number selected in step S941 is set to the memory extension area index number of the address translation table block position information 222.

The controller processing unit 210 determines whether or not there is an entry whose "use status" in the memory extension area management table 221 is "unused" (step S944). When there is an entry whose "use status" in the memory extension area management table 221 is "unused" (Yes in step S944), step S941 and steps subsequent thereto are repeated.

After the initialization process ends as described above, the host OS 102 of the host computer 100 performs the following operation until a power-off notification is given.

The host OS 102 monitors the capacity of the host memory 120 used by the application program 101 and the host OS 102. When the capacity which is in use in the host memory 120 decreases, a notification of an area usable as the memory extension area is given to the device driver 103. On the other hand, when the capacity of the host memory 120 to be used increases, an instruction to release the area used as the memory extension area is given to the device driver 103.

As an example of an operation when the capacity which is in use in the host memory 120 decreases, there is an operation in which the application program 101 ends, and the code area and data area in the host memory 120 used by the application program 101 are released.

When there is a memory area that is not in use in the host memory 120, the host OS 102 gives a notification indicating that there is a memory area that is not in use in the host memory 120 to the device driver 103.

As an example of an operation when the capacity used by the host memory 120 increases, there is an operation in which the application program 101 is activated, and the code area and the data area used by the application program 101 are newly secured in the host memory 120.

When the capacity of the host memory 120 to be used increases, the host OS 102 notifies the device driver 103 of an area to be released.

Figure 19:
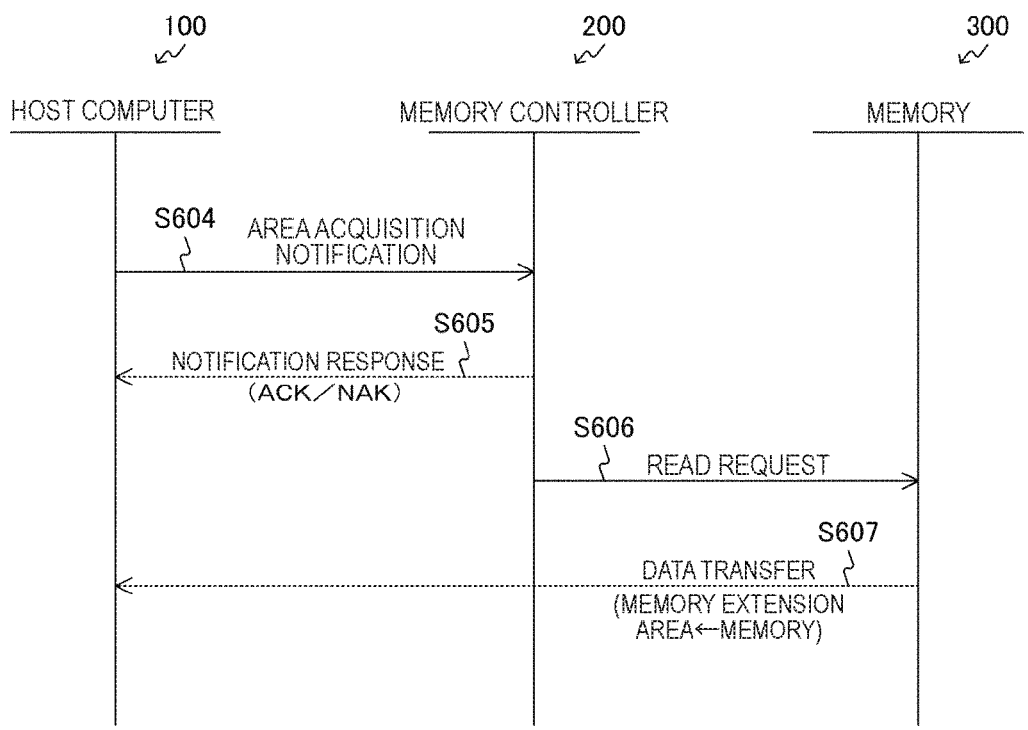
FIG. 19 is a sequence diagram illustrating an example of an additional memory area acquisition process according to an embodiment of the present technology.

FIG. 19 is a sequence diagram illustrating an example of an additional memory area acquisition process according to the embodiment of the present technology.

The host computer 100 additionally acquires the memory extension area 121. Then, a notification of the address and the size of the memory extension area 121 (Acquisition Notification) is given to the memory controller 200 (step S604).

When the size of the acquired memory extension area 121 is confirmed, the memory controller 200 that has received the area acquisition notification transmits a notification response to the host computer 100 (step S605). The notification response indicates "ACK" when the size of the memory extension area 121 satisfies the condition and "NAK" when the size of the memory extension area 121 does not satisfy the condition.

Then, the memory controller 200 transmits a read request to the memory 300 in order to transfer the data to the acquired memory extension area 121 (step S606). Accordingly, the data is read from the memory 300, and the data is transferred to the memory extension area 121 (step S607).

Figure 20:
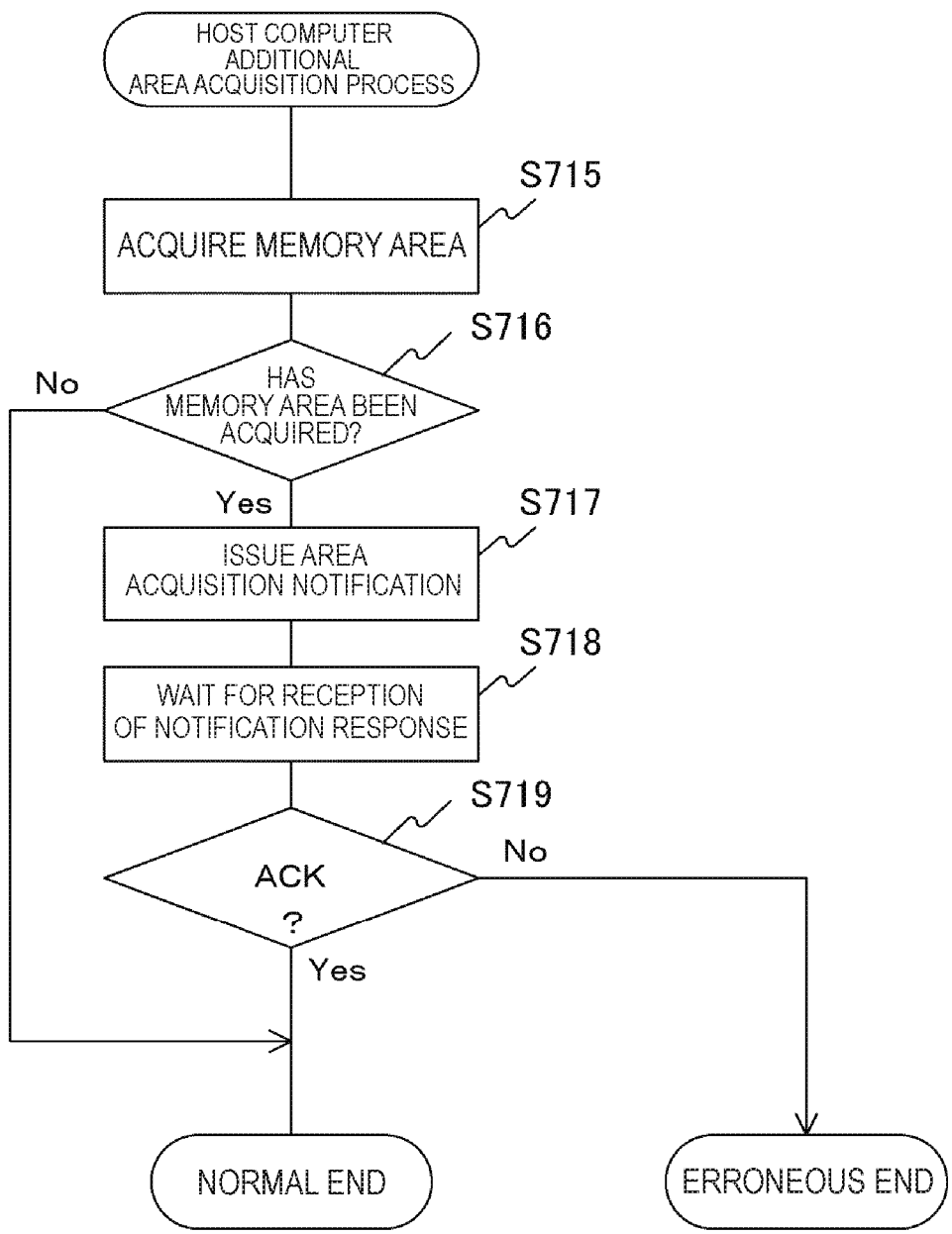
FIG. 20 is a flowchart illustrating a procedure example of an additional memory area acquisition process by a device driver 103 of the host computer 100 according to an embodiment of the present technology.

FIG. 20 is a flowchart illustrating a procedure example of an additional memory area acquisition process by the device driver 103 of the host computer 100 according to the embodiment of the present technology. When the device driver 103 receives a notification indicating that there is a memory area which is not in use in the host memory 120 from the host OS 102, the device driver 103 notifies the memory controller 200 of an area usable as the memory extension area 121 through the following procedure example.

The host processing unit 110 designates the acquisition size Mget and acquires the memory extension area 121 from the host OS 102 (step S715).

The host processing unit 110 determines whether or not the memory extension area 121 has been successfully acquired (step S716). When the memory extension area 121 is unable to be acquired (No in step S716), the additional memory area acquisition process ends normally. On the other hand, when the memory extension area 121 has been acquired (Yes in step S716), step S717 and steps subsequent thereto are performed.

The host processing unit 110 notifies the memory controller 200 of an address and a size of the acquired memory extension area 121 (step S717). Then, the host processing unit 110 waits for a notification response (ACK or NAK) from the memory controller 200 (step S718). When the notification response is not ACK (No in step S719), the host processing unit 110 gives a notification indicating that that the notified area is not used to the host OS 102. In this case, the host processing unit 110 determines that a certain abnormality has occurred in a function relating to the memory extension function, and does not perform the operation related to the memory extension function. On the other hand, when the notification response is ACK (Yes in step S719), the host processing unit 110 performs an operation related to the memory extension function.

Figure 21:
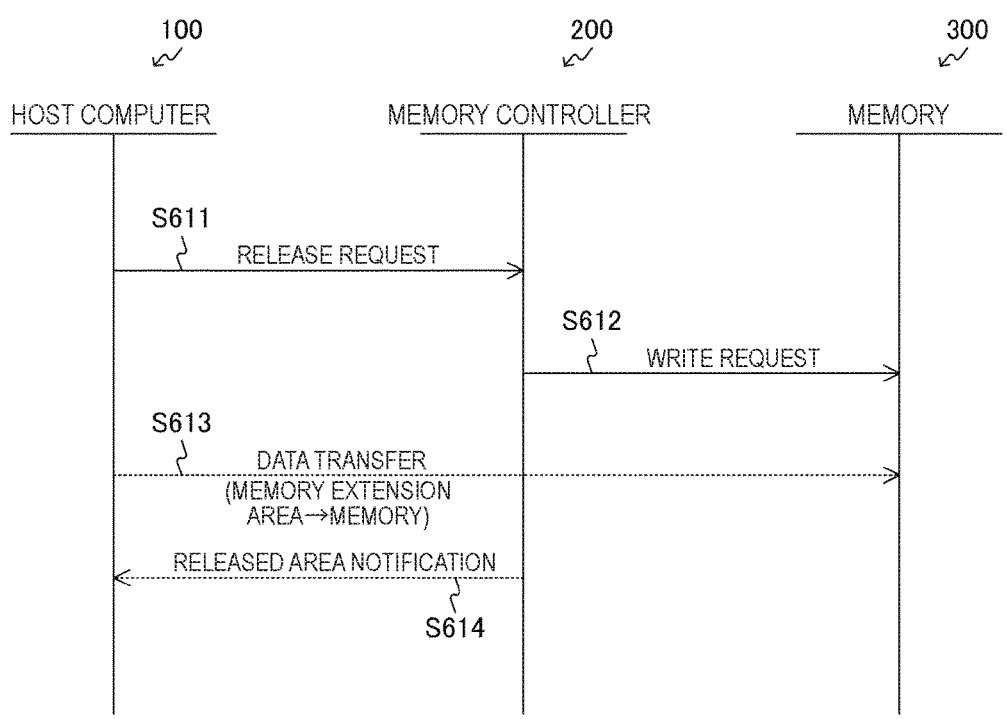
FIG. 21 is a sequence diagram illustrating an example of a memory release process according to an embodiment of the present technology.

FIG. 21 is a sequence diagram illustrating an example of a memory release process according to the embodiment of the present technology.

When a notification of the memory extension area 121 to be released is given from the host OS 102, the device driver 103 issues a release request (Release Request) to the memory controller 200 (step S611). In this case, the area to be released may be the whole memory extension area 121 or may be a part thereof.

When the latest data is in the memory extension area 121, the memory controller 200 that has received the release request issues the write request to the memory 300 (step S612) and performs data transfer from the memory extension area 121 to the memory 300 (Step S613). Then, the memory controller 200 notifies the host computer 100 of the released area (step S614).

Figure 22:
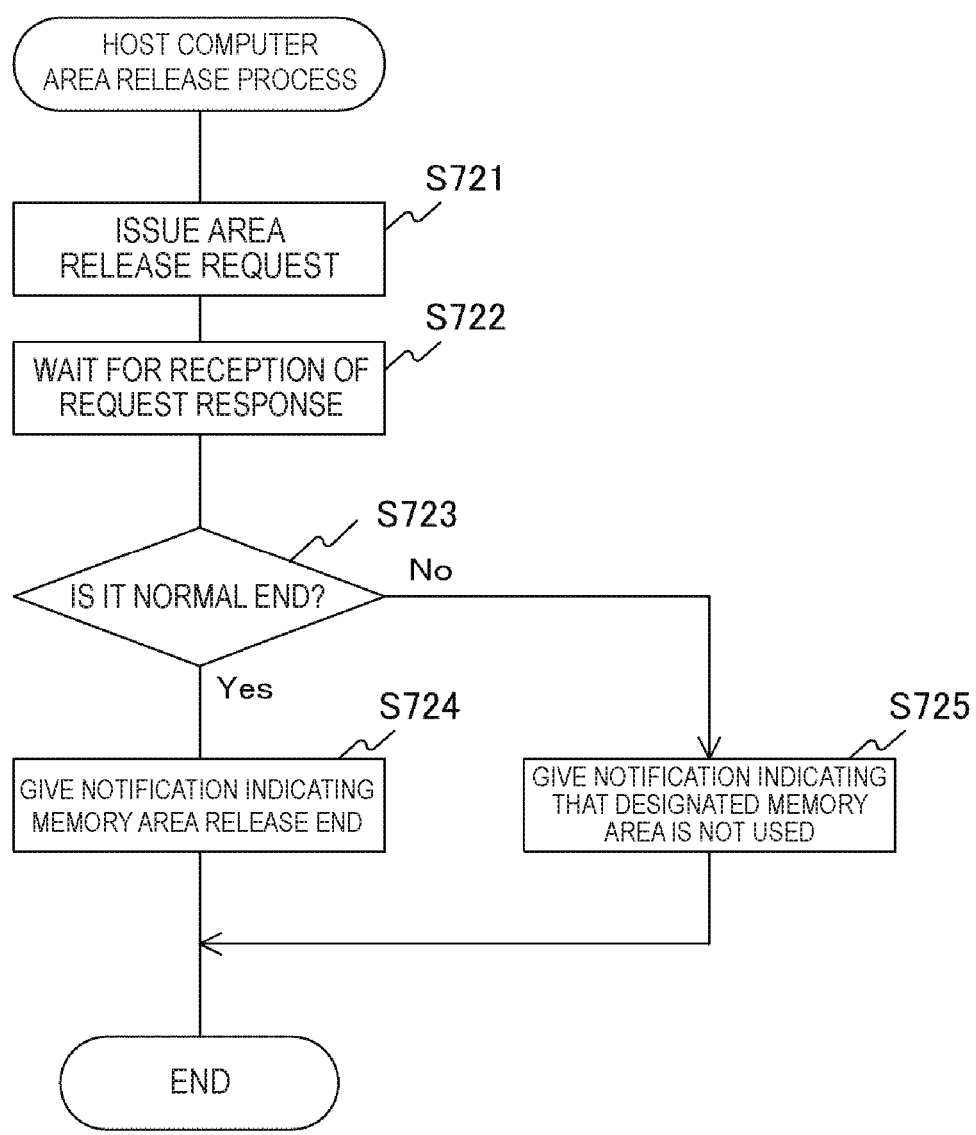
FIG. 22 is a flowchart illustrating a procedure example of a memory release process by the device driver 103 of the host computer 100 according to an embodiment of the present technology.

FIG. 22 is a flowchart illustrating a procedure example of the memory release process by the device driver 103 of the host computer 100 according to the embodiment of the present technology.

The device driver 103 issues the release request, and transmits the address and the size of the memory area requested to be released from the host OS 102 to the memory controller 200 (step S721). Thereafter, the device driver 103 waits for a response to the release request from the memory controller 200 (step S722).

When the response from the memory controller 200 indicates a normal end (Yes in step S723), the device driver 103 gives a notification indicating that the designated memory area has been released to the host OS 102 (step S724). On the other hand, when the response from the memory controller 200 does not indicate the normal end (No in step S723), the device driver 103 gives a notification indicating that the designated memory area is not in use to the host OS 102 (step S725).

Figure 23:
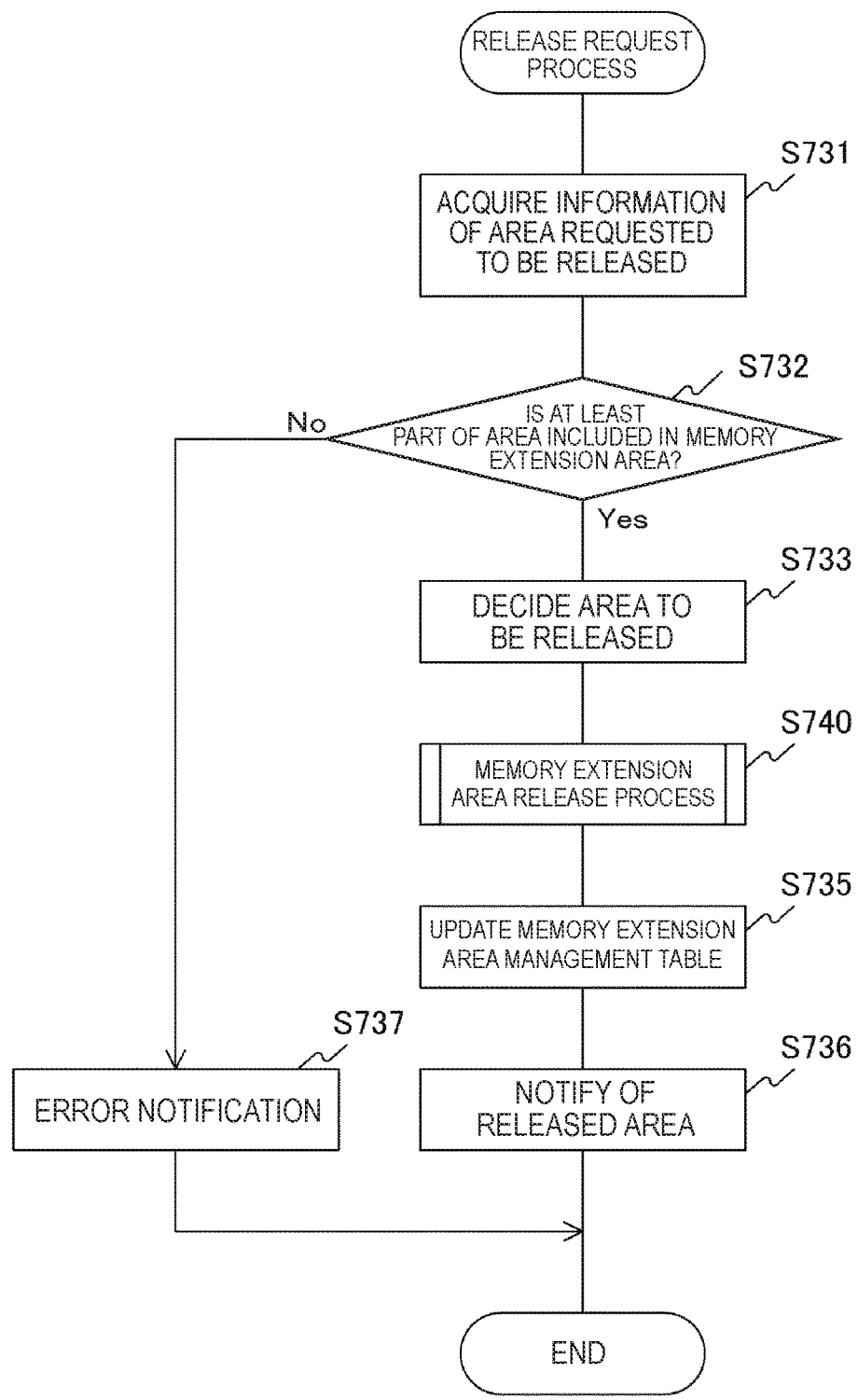
FIG. 23 is a flowchart illustrating a procedure example of a memory release process by a memory extension area management task of the memory controller 200 according to an embodiment of the present technology.

FIG. 23 is a flowchart illustrating a procedure example of the memory release process by the memory extension area management task of the memory controller 200 according to the embodiment of the present technology.

The controller processing unit 210 holds the address and the size of the memory area requested by the release request in the controller memory 220 (step S731).

The controller processing unit 210 determines whether or not at least a part of the memory area requested by the release request is included in the area managed in the memory extension area management table 221 (step S732). When the requested memory area is not included in the management area of the memory extension area management table 221 at all (No in step S732), a notification indicating that the memory area to be released is not included in the memory extension area 121 is given to the device driver 103 (Step S737). When the requested memory area is included in the management area of the memory extension area management table 221 (Yes in step S732), the controller processing unit 210 performs the following process.

The controller processing unit 210 decides a memory extension area to be released on the basis of the information of the memory extension area management table 221 (step S733). The memory extension area to be released is all the memory areas (64 KB) of the index numbers including the memory area requested by the release request. The controller processing unit 210 designates the index number decided in step S733 and performs the process of releasing the memory extension area (step S740). Content of the release process will be described later.

When the release process ends, the controller processing unit 210 updates the memory extension area management table 221 (step S735). At this time, the controller processing unit 210 updates the "use status" corresponding to the index number of the memory extension area management table 221 decided in step S733 to "released." Then, the controller processing unit 210 notifies the device driver 103 of the released memory extension area 121 together with an area which is not requested (step S736).

Figure 24:
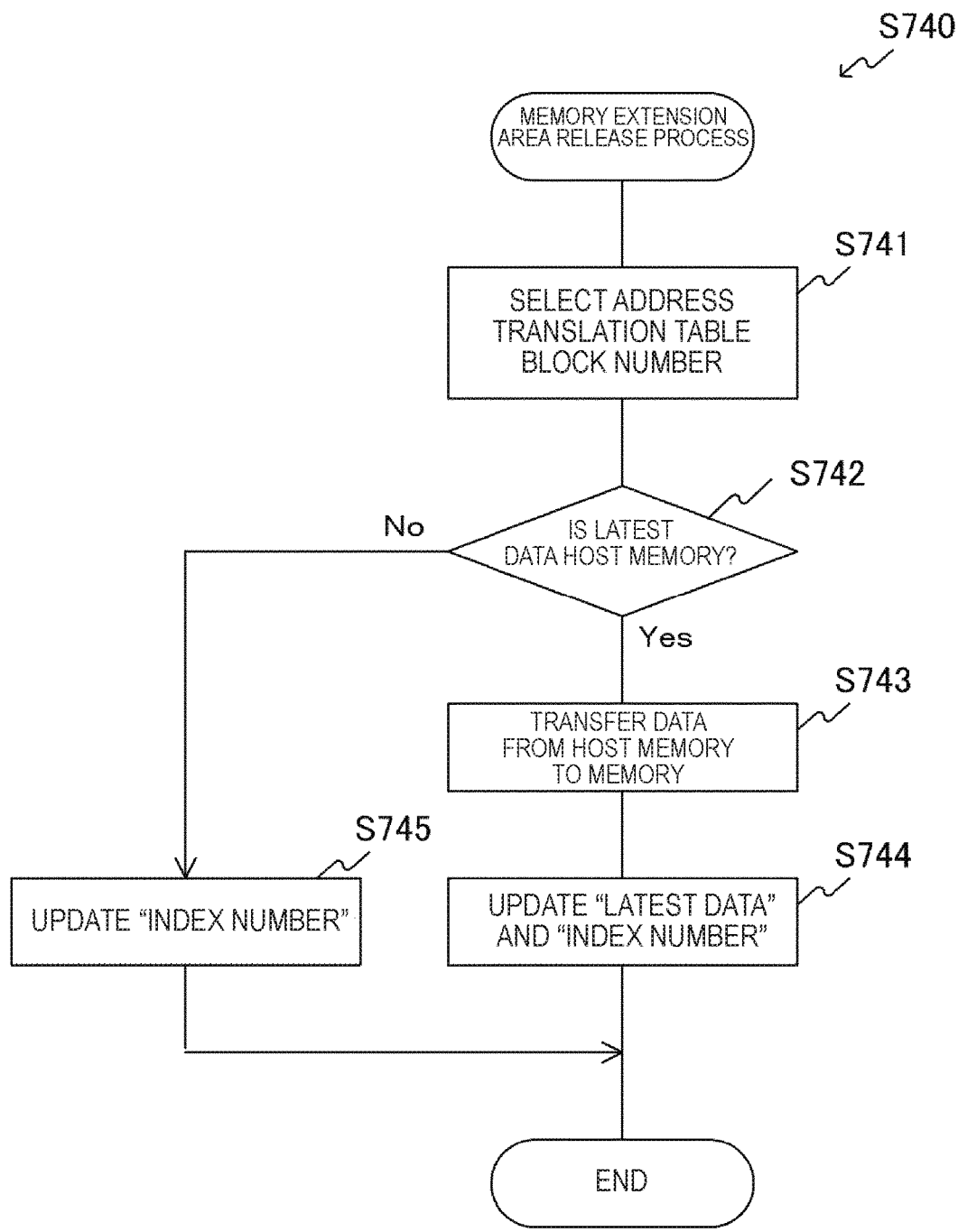
FIG. 24 is a flowchart illustrating a procedure example of a release process (step S740) of a memory extension area by a memory extension area management task of the memory controller 200 according to an embodiment of the present technology.

FIG. 24 is a flowchart illustrating a procedure example of the process (step S740) of releasing the memory extension area by the memory extension area management task of the memory controller 200 according to the embodiment of the present technology.

The controller processing unit 210 searches for the memory extension area index number to be released from the address translation table block position information 222, and selects the address translation table block number as an address translation table block to be released (step S741).

The controller processing unit 210 determines whether or not the "latest data" of the address translation table block number selected in step S741 is a "host memory" from the address translation table block position information 222 (step S742). When the "latest data" is not the "host memory" (No in step S742), the controller processing unit 210 updates the address translation table block position information 222 (step S745). At this time, the "memory extension area index number" corresponding to the address translation table block number selected in step S741 is updated to an invalid value (0xFFFF). When the "latest data" is the "host memory" (Yes in step S742), the following process is performed.

The controller processing unit 210 performs a data transfer process from the memory extension area 121 to the memory 300 (step S743). Then, the controller processing unit 210 updates the address translation table block position information 222 (step S744). At this time, the "latest data" corresponding to the address translation table block number selected in step S741 is updated to a "memory," and the "memory extension area index number" is updated to an invalid value (0xFFFF).

In the above embodiment, the address and the size of the memory area requested to be released are transmitted from the host OS 102 to the memory controller 200, but only the size may be transmitted. A modified example will be described below.

Figure 25:
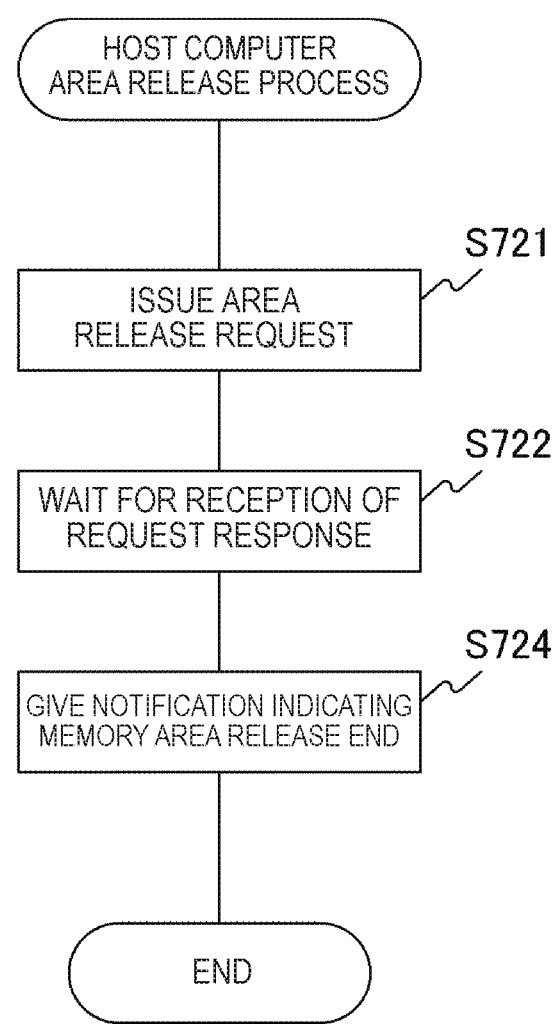
FIG. 25 is a flowchart illustrating a procedure example of a memory release process by the device driver 103 of the host computer 100 according to a modified example of the embodiment of the present technology.

FIG. 25 is a flowchart illustrating a procedure example of a memory release process by the device driver 103 of the host computer 100 according to a modified example of the embodiment of the present technology.

The device driver 103 issues the release request and transmits the size of the memory area requested to be released from the host OS 102 to the memory controller 200 (step S721). Thereafter, the device driver 103 waits for a response to the release request from the memory controller 200 (step S722). When there is a response to the release request, the device driver 103 gives a notification indicating that the designated memory area has been released to the host OS 102 (step S724).

Figure 26:
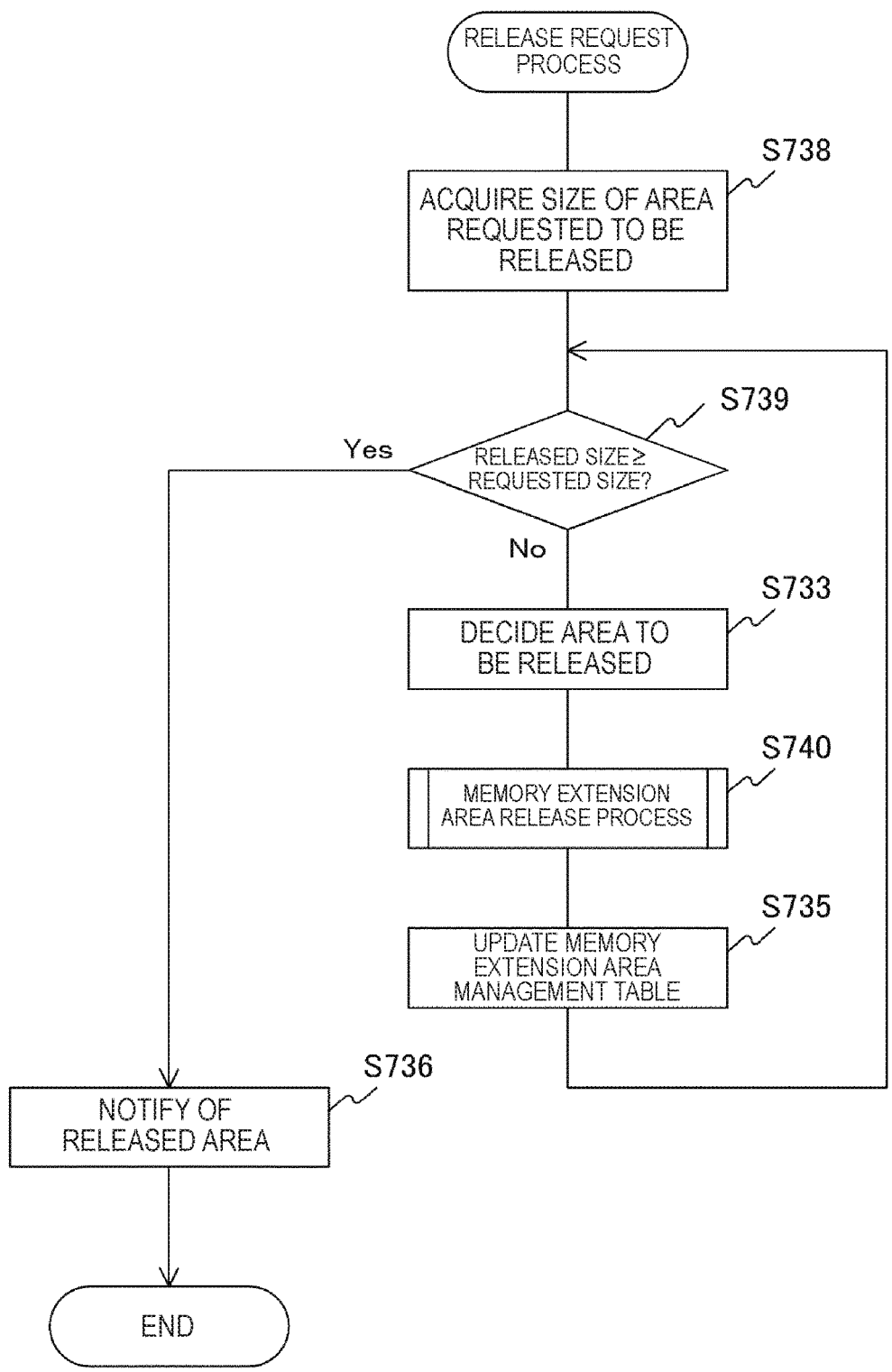
FIG. 26 is a flowchart illustrating a procedure example of a memory release process by a memory extension area management task of the memory controller 200 according to a modified example of the embodiment of the present technology.

FIG. 26 is a flowchart illustrating a procedure example of the memory release process by the memory extension area management task of the memory controller 200 according to the modified example of the embodiment of the present technology.

The controller processing unit 210 holds the size of the memory area requested by the release request in the controller memory 220 (step S738). The controller processing unit 210 sets "0" as the released memory size.

The controller processing unit 210 compares the released memory size with the size requested to be released (step S739). When the released memory size is equal to or larger than the requested size (Yes in step S739), the controller processing unit 210 notifies the device driver 103 of the released memory extension area 121 (step S736). On the other hand, when the released memory size is less than the requested size (No in step S739), the following process is repeated.

The controller processing unit 210 decides the memory extension area to be released on the basis of the information of the memory extension area management table 221 and the address translation table access frequency information table 223 (step S733). The controller processing unit 210 selects the memory extension area 121 in which the address translation table block having the smallest "access frequency" is held among the address translation table blocks held in the memory extension area 121 as the memory extension area to be released. The controller processing unit 210 designates the index number decided in step S733 and performs the process of releasing the memory extension area (step S740). The content of the release process is the same as described above.

When the release process ends, the controller processing unit 210 updates the memory extension area management table 221 (step S735). At this time, the controller processing unit 210 updates the "use status" corresponding to the index number of the memory extension area management table 221 decided in step S733 to "released." Further, the controller processing unit 210 adds the size of the released memory extension area as the released memory size.

In the modified example described above, when the size is designated as a parameter instructed to the device driver 103, the memory extension area to be released is decided on the basis of the access frequency (step S733), but the present technology is not limited thereto. For example, the "index number" of the memory extension area management table 221 may be randomly selected or may be selected in ascending order of the "index number" of the memory extension area management table 221.

Further, as a second modified example of the process of releasing the memory extension area, the release process may be requested by setting a flag (an urgent release flag) for making a request to perform the release process in a short time. In other words, the host OS 102 sets the urgent release flag in addition to the size of the memory area to be released as the parameters used when the used capacity of the host memory 120 is significantly increased in a short time. In that case, in the release request, the urgent release flag is set to request the memory controller 200 to perform the release process in a short time.

A processing procedure of the process of releasing the memory extension area according to the second modified example is the same as the processing procedure of FIG. 26 described above. However, a difference lies in that, when the area is decided in step S733, the memory extension area management table 221, the address translation table block position information 222, and the address translation table access frequency information table 223 are referred to.

In other words, the controller processing unit 210 searches for the address translation table block number whose "latest data" is the "memory" in the address translation table block position information 222 and selects it as the memory extension area to be released. When there is no corresponding block number, the memory extension area 121 in which the address translation table block having the smallest "access frequency" is held is selected among the address translation table blocks held in the memory extension area 121.

In addition, as another modified example of securing the memory extension area and performing the release process, when a plurality of write commands or a plurality of read commands for data are issued, the memory area usable as the memory extension area may be requested and secured as follows. A plurality of commands are issued, for example, when 16 commands are issued to the host OS 102, for example, to the memory controller 200 capable of queuing 32 commands. Further, the device driver 103 may issue a command to the memory controller 200 or may request the memory controller 200 to release the memory extension area when there is neither a write command nor a read command for data which is being executed.

In addition, as another modified example, the device driver 103 may periodically read the address translation table access frequency information table 223 and change the size of the memory extension area on the basis of a difference between the access frequencies.

In this case, for example, the device driver 103 issues the read command for the address translation table access frequency information table 223 to the memory controller 200 at intervals of one minute. The device driver 103 compares the address translation table access frequency information table 223 read one minute before with the newly read address translation table access frequency information table 223. Then, a necessary size Mneeded of the area for holding the number of address translation table blocks whose difference exceeds 50 times is calculated and compared with a used size Moccupied of the memory extension area which is in use.

At this time, when the necessary size Mneeded is larger than the used size Moccupied, the device driver 103 transmits the release request for a memory extension area of a size of "Moccupied-Mneeded" to the memory controller 200. Then, a notification of the released area is given to the host OS 102. On the other hand, when the required size Mneeded is less than or equal to the used size Moccupied, the device driver 103 transmits an acquisition request for the memory area of the size of "Mneeded-Moccupied" to the host OS 102. Then, a notification of the acquired area is given to the memory controller 200.

Figure 27:
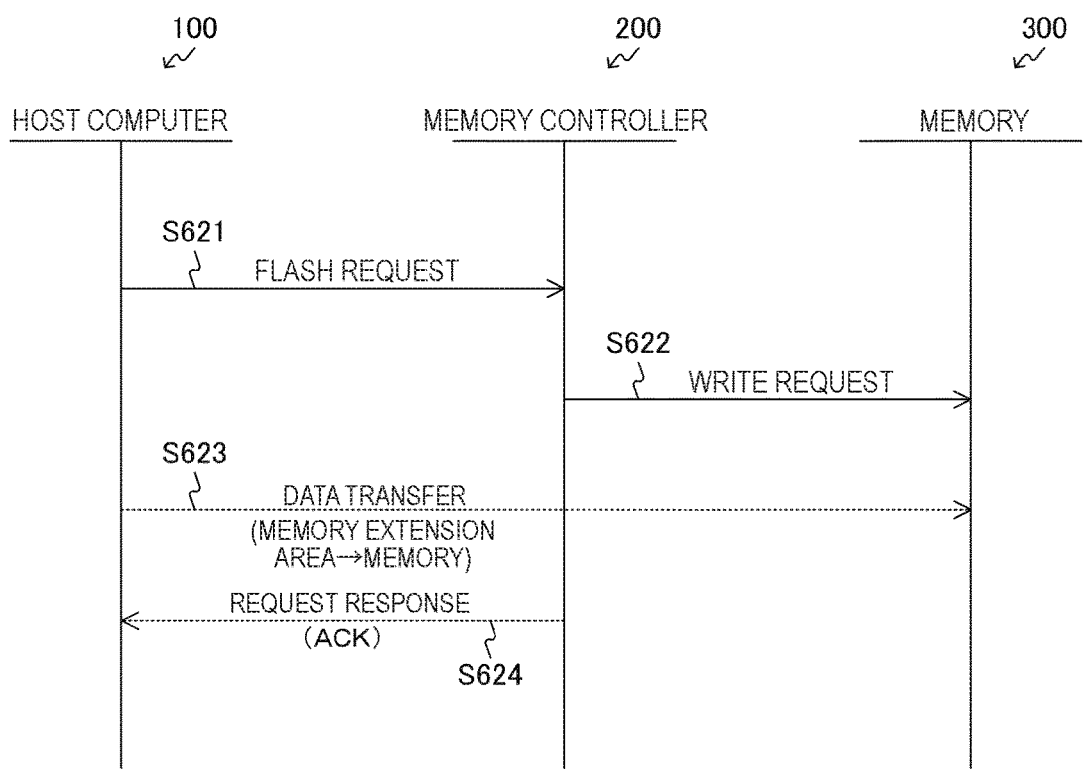
FIG. 27 is a sequence diagram illustrating an example of a flash command process according to an embodiment of the present technology.

FIG. 27 is a sequence diagram illustrating an example of a flash command process according to the embodiment of the present technology. The flash command is a command for saving all data in the host memory 120 used as the memory extension area 121 in the memory 300. Specifically, the flash command is a command used for the host computer 100 to save data which the memory controller 200 holds in the memory extension area 121 and the address translation table holding area 224 of the memory controller 200 in the memory 300.

Upon receiving the power-off notification or the like from the host OS 102, the device driver 103 issues the flash command to the memory controller 200 (step S621).

Upon receiving the flash command, the memory controller 200 issues the write request to the memory 300 (step S622) and performs data transfer from the memory extension area 121 to the memory 300 (step S623). Then, the memory controller 200 gives a notification indicating the saving to the host computer 100 (step S624).

Figure 28:
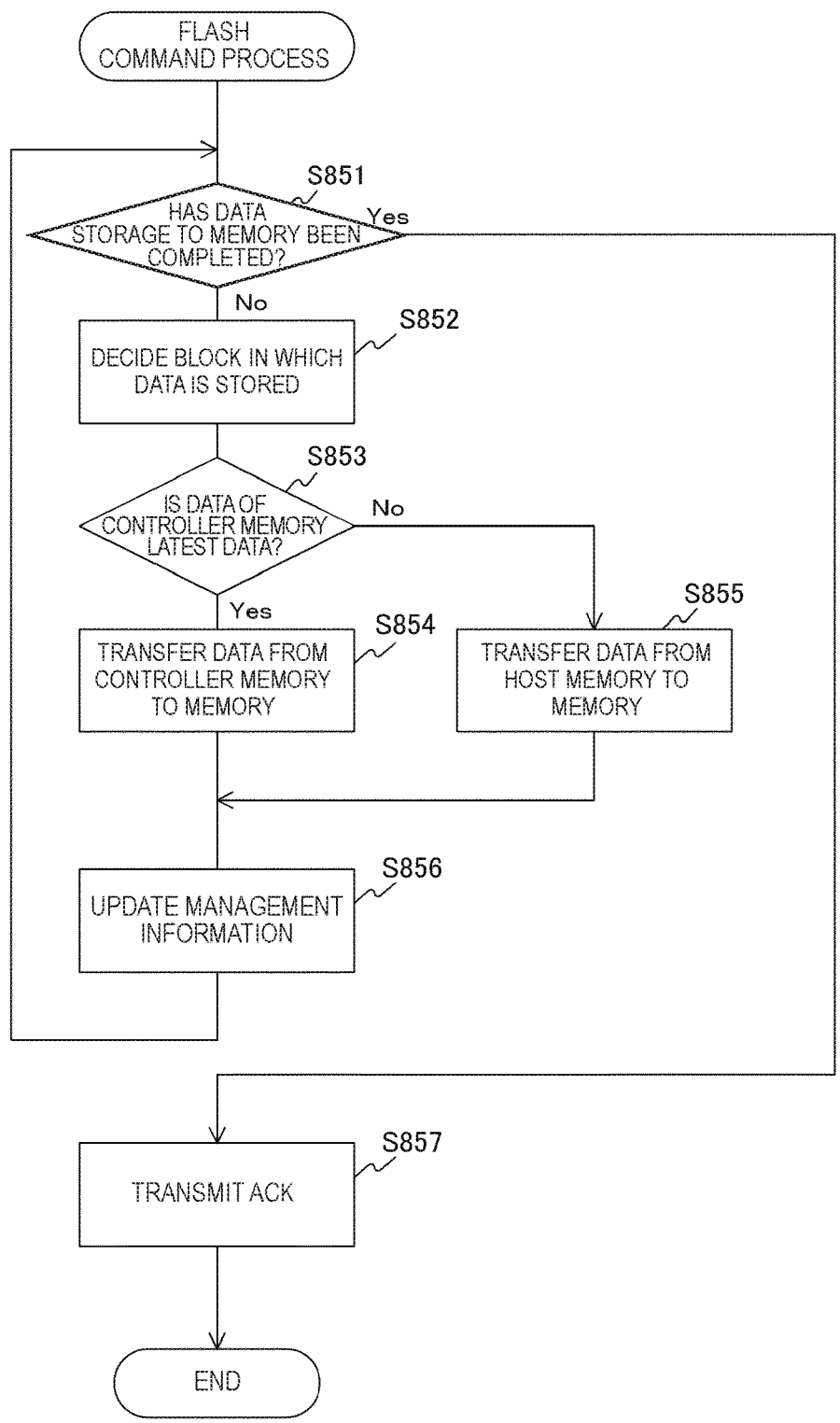
FIG. 28 is a flowchart illustrating a procedure example of a flash command process by a memory extension area management task of the memory controller 200 according to an embodiment of the present technology.

FIG. 28 is a flowchart illustrating a procedure example of a flash command process by the memory extension area management task of the memory controller 200 according to the embodiment of the present technology.

The controller processing unit 210 determines whether or not the "latest data" in the address translation table block position information 222 is the "memory" (step S851). If all "latest data" is the "memory" (Yes in step S851), the data storage in the memory 300 is determined to have been completed, and a notification of ACK is given to the device driver 103 (step S857). When there is any one piece of "latest data" which is not "memory" (No in step S851), step S852 and a process subsequent thereto are performed.

The controller processing unit 210 searches for the "address translation table block number" of the address translation table block position information 222 in order from "0." Then, an area in which the "latest data" is not the "memory" is selected as an area in which data is stored in the memory 300 (step S852).

The controller processing unit 210 determines whether or not the "latest data" in the address translation table block position information 222 selected in step S852 is the "controller memory 220" (step S853). When the "latest data" is the "controller memory 220" (Yes in step S853), the controller processing unit 210 transfers the data of the address translation table block stored in the controller memory 220 to the memory 300 and performs writing (step S854). On the other hand, when the "latest data" is not the "controller memory 220" (No in step S853), the memory extension area management table 221 and the address translation table block position information 222 are referred to. Then, the data of the address translation table block held in the host memory 120 is transferred and written in the memory 300 (step S855).

The controller processing unit 210 updates the address translation table block position information 222 (step S856). At this time, the controller processing unit 210 updates the corresponding "latest data" of the "address translation table block number" of the address translation table block position information 222 selected in step S852 to the "memory."

Figure 29:
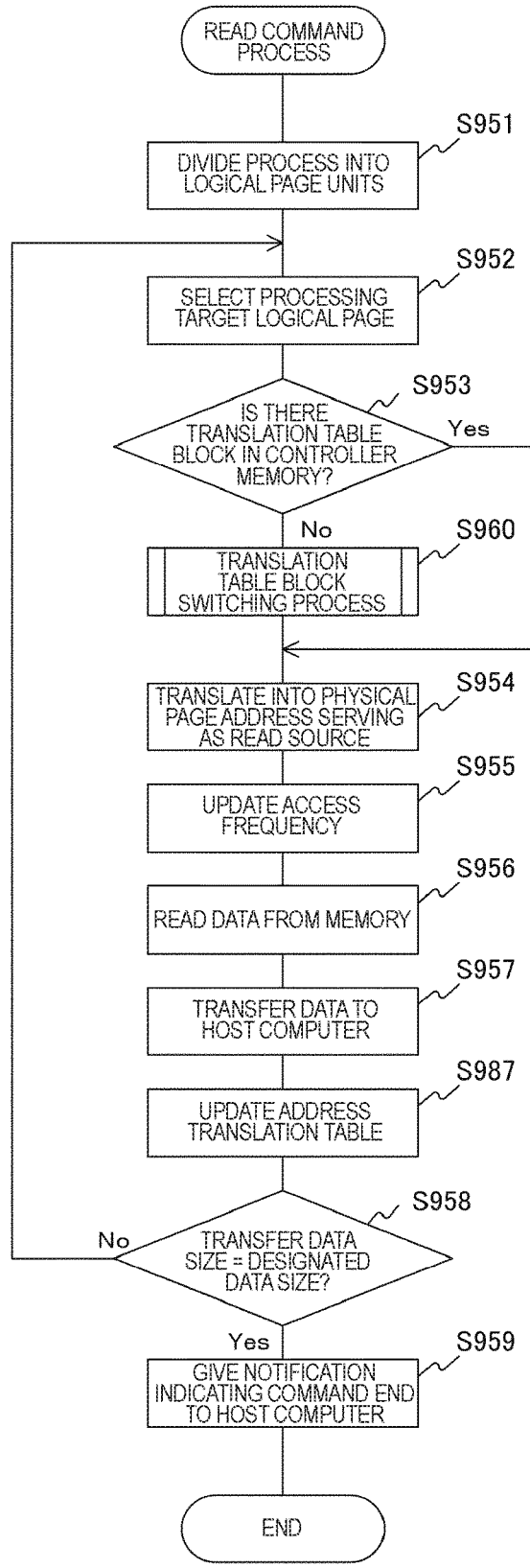
FIG. 29 is a flowchart illustrating a procedure example of a read command process by a command execution task of the memory controller 200 according to an embodiment of the present technology.

FIG. 29 is a flowchart illustrating a procedure example of the read command process by the command execution task of the memory controller 200 according to the embodiment of the present technology. In the host computer 100, the device driver 103 issues the read command when an instruction to execute the read command is given from the host OS 102. A read start logical address and a size are indicated from the host OS 102 as parameters. The read command issued via the device driver 103 includes the read start logical address and the size.

The controller processing unit 210 divides the process into logical address units on the basis of the received start logical address and size (step S951). One logical address is executed in one process. For example, when "0" is designated as a start address of a read target, and "1" is designated as the size, one process is performed. Alternatively, when "0" is designated as the starting logical address of the read target, and "2" is designated as the size, the process is divided into two.

The controller processing unit 210 decides a logical address of a read target (step S952). The target logical address is sequentially decided from the start logical address of the read target. When "0" is designated as the start logical address of the read target, and "2" is designated as the data size, "0" is decided as the logical address at which the process is initially performed. "1" is decided as a next target logical address.

The controller processing unit 210 determines whether or not there is an address translation table block including a logical address decided as a read target in the address translation table holding area 224 of the controller memory 220 (step S953). When there is no address translation table block in the address translation table holding area 224 (No in step S953), a process of switching the address translation table block is performed in the memory extension area management task (step S960). Accordingly, the address translation table block including the logical address decided as the read target is held in the address translation table holding area 224. The process of switching the address translation table will be described later in detail.

The controller processing unit 210 translates the logical address decided as the read target into a physical address with reference to the address translation table (step S954). When the physical address is unallocated, an unused page address is acquired from the alternative page management table 225. At this time, the "use status" of the address translation table is updated to "allocated."

The controller processing unit 210 increments and updates the value of the "access frequency" corresponding to the block number of the address translation table referred to in step S954 in the address translation table access frequency information table 223 (step S955).

The controller processing unit 210 designates the physical address translated in step S954 and issues the read request to the memory 300 (step S956). The controller processing unit 210 performs the error correction on the data read from the memory 300, and transfers the error-corrected data to the host computer 100 (step S957). At this time, the data to be transferred is 512 bytes.

When an unused page is acquired in step S954, the controller processing unit 210 updates the "physical address" of the address translation table to the physical address of the acquired page (step S987). When the "physical address" is updated, the "latest data" of the address translation table block position information 222 is updated to the "controller memory."

The controller processing unit 210 determines whether or not a sum of the data sizes transferred to the host computer 100 in the read command process coincides with the data size designated in the read command (step S958). When the data sizes coincide with each other (Yes in step S958), a notification indicating the end of the read command process is given to the host computer 100 (step S959). When the data sizes do not coincide with each other (No in step S958), step S952 and steps subsequent thereto are repeated.

Figure 30:
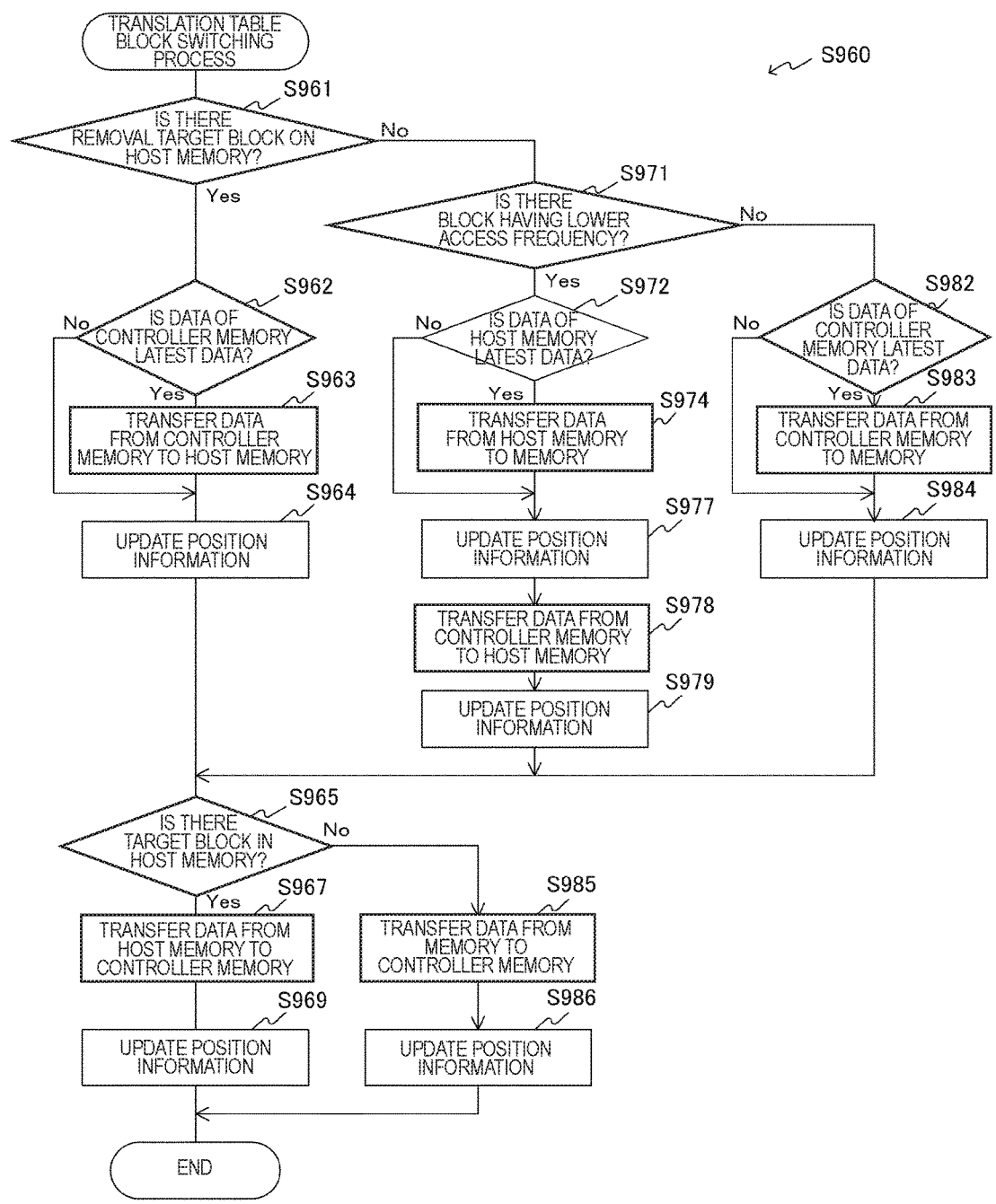
FIG. 30 is a flowchart illustrating a procedure example of an address translation table block switching process (step S960) by a memory extension area management task of the memory controller 200 according to an embodiment of the present technology.

FIG. 30 is a flowchart illustrating a procedure example of the address translation table block switching process (step S960) by the memory extension area management task of the memory controller 200 according to the embodiment of the present technology. In the address translation table block switching process, the data on the controller memory 220 is removed to secure an empty area, and data is newly transferred from the memory extension area 121 or memory 300 to the secured empty area. In the following description, there are cases in which the memory extension area 121 is simply described as the host memory 120.

The controller processing unit 210 determines whether or not there is an address translation table block of the number held in the controller memory 220 in the host memory 120 with reference to the address translation table block position information 222 (step S961). The address translation table block held in the controller memory 220 is a removal target block. When there is a removal target block in the host memory 120 (Yes in step S961), step S962 and steps subsequent thereto are performed. When there is no removal target block in the host memory 120 (No in step S961), step S971 and steps subsequent thereto are is performed.

The controller processing unit 210 determines whether or not the data of the address translation table block of the number held in the controller memory 220 is the latest data with reference to the address translation table block position information 222 (step S962). When the data of the address translation table block of the number held in the controller memory 220 is the latest data (Yes in step S962), the controller processing unit 210 specifies transfer data with reference to the memory extension area management table 221 and the address translation table block position information 222. In other words, the data of the address translation table block held in the controller memory 220 is transferred to the area in which the data of the address translation table block of the same number in the host memory 120 is held (step S963). Accordingly, the latest data is reflected in the memory extension area 121 of the host memory 120.

The controller processing unit 210 updates the "latest data" and the "controller memory index number" corresponding to the address translation table block number held in the controller memory 220 in the address translation table block position information 222 (step S964). At this time, the "controller memory index number" is updated to an invalid value (0xFF). Alternatively, when the "latest data" is the "controller memory," it is updated to the "host memory." If the "latest data" is the "host memory" or the "memory," updating is not performed.

The controller processing unit 210 determines whether or not there is data of the address translation table block having a lower access frequency than the address translation table block of the number held in in the controller memory 220 in the host memory 120 (step S971). At this time, the address translation table access frequency information table 223 is referred to. When there is an address translation table block having a lower access frequency (Yes in step S971), step S972 and steps subsequent thereto are performed. When there is no address translation table block having a lower access frequency (No in step S971), step S982 and steps subsequent thereto are performed.

The controller processing unit 210 selects the number of the address translation table block having the lowest access frequency among the address translation table blocks in the host memory 120 and determines whether or not the data of the host memory 120 is the latest data (step S972). In other words, it is determined whether or not the corresponding "latest data" is the "host memory" with reference to the address translation table block position information 222.

When the data of the host memory 120 is the latest data (Yes in step S972), the controller processing unit 210 transfers the data of the address translation table block held in the host memory 120 to the memory 300 and performs writing (step S974). At this time, the memory extension area management table 221 and the address translation table block position information 222 are referred to.

The controller processing unit 210 updates "latest data" and "host memory index number" of the address translation table block selected in step S972 in the address translation table block position information 222 (step S977). At this time, the "host memory index number" is updated to an invalid value (0xFFFFF). Alternatively, when the "latest data" is the "host memory," it is updated to the "memory." When the "latest data" is the "memory," updating is not performed.

The controller processing unit 210 refers to the memory extension area management table 221 and the address translation table block position information 222. Then, in step S978, the data of the address translation table block held in the controller memory 220 is transferred to the area of the host memory 120 in which the data of the address translation table block of the number selected in step S972 is held.

The controller processing unit 210 updates content corresponding to the address translation table block number held in the controller memory 220 in the address translation table block position information 222 (step S979). Here, the "latest data," the "controller memory index number," and the "host memory index number" are update targets. The "controller memory index number" is updated to an invalid value (0xFF). The "host memory index number" is updated to the index number of the transferred memory extension area 121. When the "latest data" is the "controller memory," it is updated to the "host memory." When the "latest data" is the "host memory" or the "memory," updating is not performed.

The controller processing unit 210 determines whether or not the data of the address translation table block of the number held in the controller memory 220 is the latest data with reference to the address translation table block position information 222 (step S982). When the data of the address translation table block of the number held in the controller memory 220 is the latest data (Yes in step S982), the controller processing unit 210 transfers the data of the address translation table block held in the controller memory 220 to the memory 300 and performs writing (step S983).

The controller processing unit 210 updates content corresponding to the address translation table block number held in the controller memory 220 in the address translation table block position information 222 (step S984). Here, the "latest data" and the "controller memory index number" are update targets. The "controller memory index number" is updated to an invalid value (0xFF). When the "latest data" is the "controller memory," it is updated to the "memory." When the "latest data" is the "memory," updating is not performed.

The controller processing unit 210 determines whether or not the address translation table block of the number designated as the write target to the controller memory 220 (target block) is held in the memory extension area 121 of the host memory 120 (step S965). When there is a target block in the memory extension area 121 (Yes in step S965), step S967 and steps subsequent thereto are performed. When there is no target block in the memory extension area 121 (No in step S965), step S985 and steps subsequent thereto are performed.

The controller processing unit 210 refers to the memory extension area management table 221 and the address translation table block position information 222. Then, the data of the address translation table block of the designated number is transferred from the memory extension area 121 of the host memory 120 to the address translation table holding area 224 of the controller memory 220 (step S967).

The controller processing unit 210 updates content corresponding to the address translation table block number held in the controller memory 220 in the address translation table block position information 222 (step S969). Here, the "latest data" and the "controller memory index number" are update targets. The "controller memory index number" is updated to "0x00."

The controller processing unit 210 transfers the data of the address translation table block of the designated number from the memory 300 to the address translation table holding area 224 of the controller memory 220 (step S985). The controller processing unit 210 updates the "controller memory index number" corresponding to the address translation table block number held in the controller memory 220 in the address translation table block position information 222 (step S986). Here, the "controller memory index number" is updated to "0x00."

Figure 31:
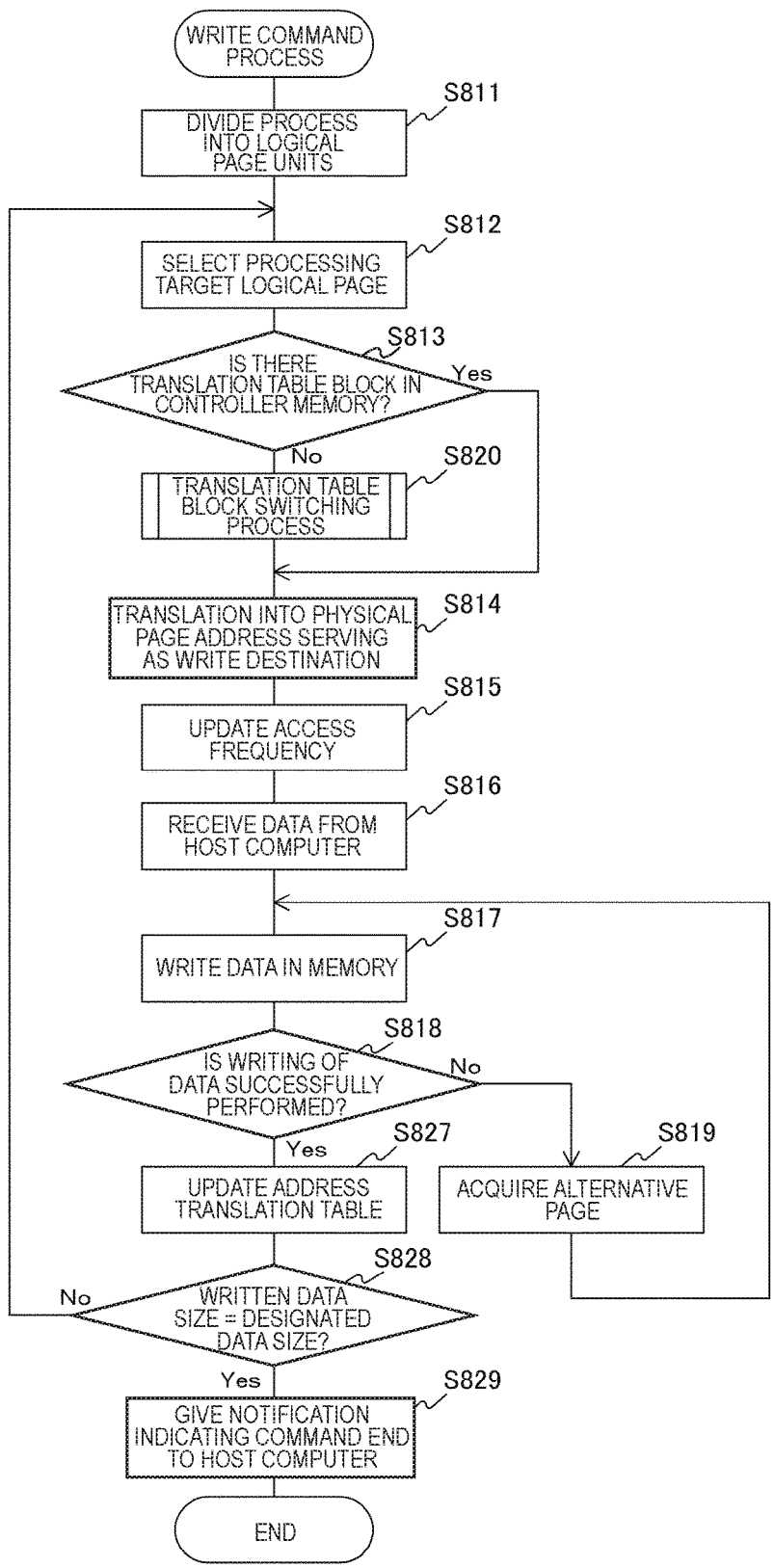
FIG. 31 is a flowchart illustrating a procedure example of a write command process by a command execution task of the memory controller 200 according to an embodiment of the present technology.

FIG. 31 is a flowchart illustrating a procedure example of the write command process by the command execution task of the memory controller 200 according to the embodiment of the present technology. In the host computer 100, the device driver 103 issues the write command when an instruction to execute the write command is given from the host OS 102. A write start logical address and a size are designated from the host OS 102 as parameters. The write command issued via the device driver 103 includes the write start logical address and the size.

Similarly to the read command, the controller processing unit 210 divides the process into logical address units on the basis of the received start logical address and the size (step S811).

Similarly to the read command, the controller processing unit 210 decides the logical address of a write target (step S812). The target logical address is sequentially decided from the start logical address of the write target.

Similarly to the read command, the controller processing unit 210 determines whether or not there is an address translation table block including a logical address decided as the write target in the address translation table holding area 224 (step S813). When there is no address translation table block in the address translation table holding area 224 (No in step S813), the process of switching the address translation table block is performed in the memory extension area management task (step S820). Accordingly, the address translation table block including the logical address decided as the write target is held in the address translation table holding area 224. The process of switching the address translation table is similar to that described above with reference to FIG. 30.

The controller processing unit 210 translates the logical address decided as the write target into a physical address with reference to the address translation table (step S814). When the physical address is unallocated, an unused page address is acquired from the alternative page management table 225. At this time, the "use status" of the address translation table is updated to "allocated."

The controller processing unit 210 increments and updates the value of the "access frequency" corresponding to the block number of the address translation table referred to in step S814 in the address translation table access frequency information table 223 (step S815).

The controller processing unit 210 receives data of a write target from the host computer 100 (step S816). The data is 512 bytes. The controller processing unit 210 adds a redundant portion to the 512-byte data. In other words, a 4-byte ECC generated by the ECC processing unit 240 is set in "ECC." Thus, write data of 516 bytes is constructed.

The controller processing unit 210 designates the physical address translated in step S814 and issues the write request for the write data to the memory 300 (step S817). When the writing of the write data fails (No in step S818), an alternative page is acquired (step S819) and the write request is made again (step S817). When the writing of the write data is successfully performed (Yes in step S818), the address translation table is updated (step S827). In other words, when an unused page is acquired in step S814, the "physical address" of the address translation table is updated to the physical address of the acquired page. When the "physical address" is updated, the "latest data" of the address translation table block position information 222 is updated to the "controller memory."

The controller processing unit 210 determines whether or not a sum of the data sizes transferred to the memory 300 in the write command process coincides with the data size designated in the write command (step S828). When the data sizes coincide with each other (Yes in step S828), a notification indicating the end of the write command process is given to the host computer 100 (step S829). When the data sizes do not coincide with each other (No in step S828), step S812 and steps subsequent thereto are repeated.

In the above embodiment, in order to improve the speed of saving data from the controller memory 220 or the host memory 120, the data may be constantly stored in the memory 300 when the address translation table is changed. In this case, it is unnecessary to manage the "latest data" in the address translation table block position information 222. Further, in this case, in the process when the release request is received, the process when the flash command is received, and the address translation table block switching process, writing to the memory and a process of determining the writing are unnecessary.

In addition in the above embodiment, the example in which a notification of Mmin, Munit, and Mmax is given to the device driver 103 as the parameters when the memory extension area 121 is acquired or released has been described, but a notification of Mmin, Munit, and Mmax may not be given. In the memory extension area management task, the management can be performed through the unallocated memory extension area management table 227 when the size of the area reported as the memory extension area 121 from the device driver 103 is not a multiple of Munit or smaller than Mmin.

FIG. 32 is a diagram illustrating a field configuration example of the unallocated memory extension area management table 227 according to the embodiment of the present technology. The unallocated memory extension area management table 227 has fields such as a "division number," a "start address," and a "size."

The "division number" is a field indicating the number of further divisions in the physical address space of the host memory 120 in the management unit of the memory extension area 121. The "start address" is a field indicating a start address of an area usable as the memory extension area 121 corresponding to a corresponding index using a physical address. The "size" is a field indicating a size of an area usable as the memory extension area 121 corresponding to the corresponding index.

When the size of the memory extension area 121 is less than Mmin, if the memory area managed by the unallocated memory extension area management table 227 is equal to or larger than Mmin, it is used as the memory extension area 121. Alternatively, when the size of the memory extension area is equal to or larger than Mmin, if the memory area managed by the unallocated memory extension area management table 227 is equal to or larger than Munit, it is used as the memory extension area 121.

As described above, according to the first embodiment of the present technology, it is possible to flexibly change a use area for the address translation table 311 in the memory extension area 121.

<2. Second Embodiment>

In the first embodiment, the address translation table is stored in the memory extension area 121, but in a second embodiment, an error correcting code (ECC) of data stored in the memory 300 is stored in the memory extension area 121. Since overviews of a system configuration and a process are similar to those of the first embodiment, description thereof will be omitted here.

Figure 33:
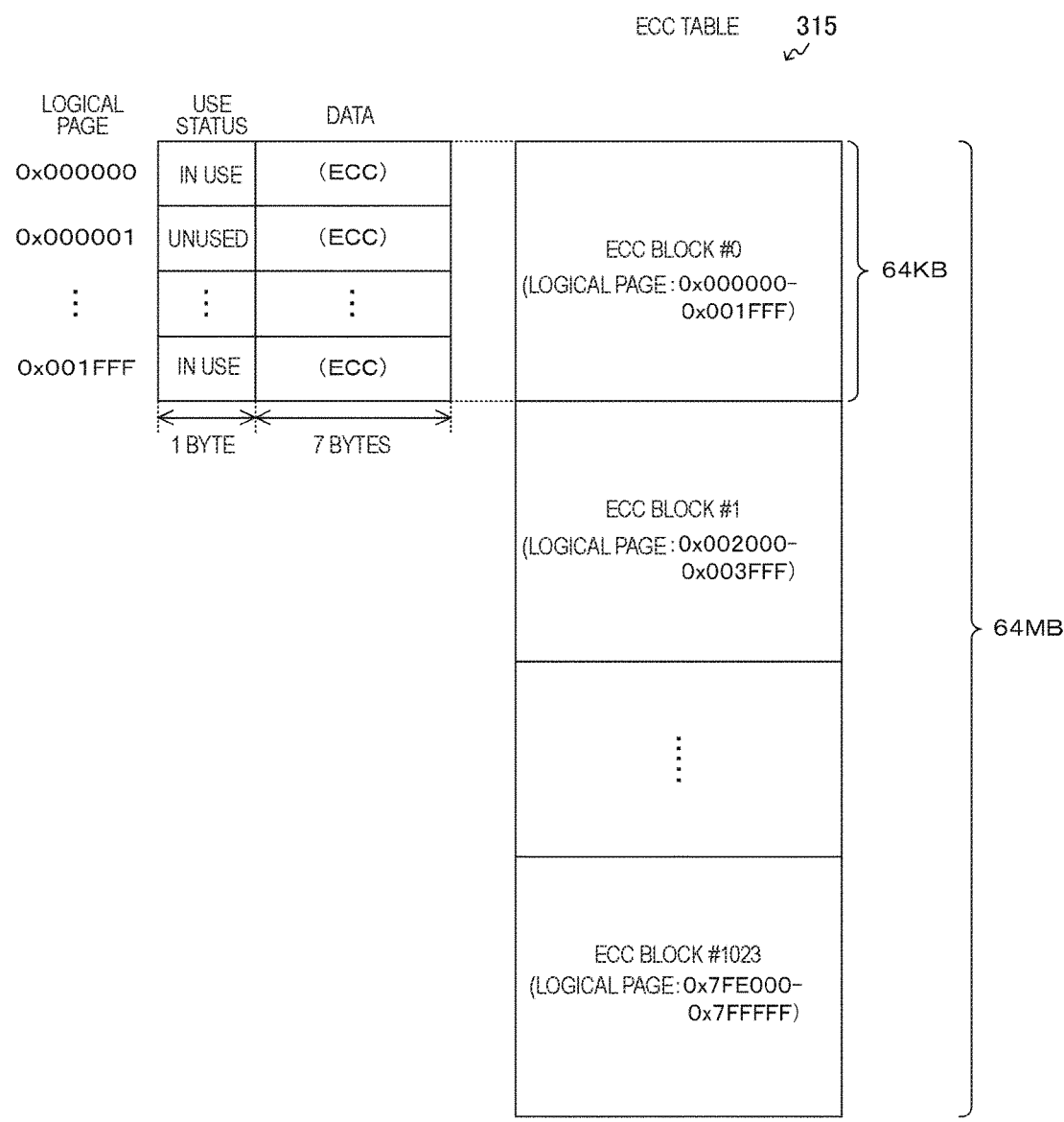
FIG. 33 is a diagram illustrating an example of a configuration of an ECC table 315 according to a second embodiment of the present technology.

FIG. 33 is a diagram illustrating an example of a configuration of an ECC table 315 according to the second embodiment of the present technology. In the second embodiment, it is assumed that an ECC is not stored in the same physical page as the 512-byte data, and the ECC table 315 is provided as a table for storing and managing the ECC and recorded in a management data area of the memory 300.

In this example, the ECC table 315 is configured with 1024 ECC blocks each having 64 KB. Therefore, a total capacity of the ECC table 315 is 64 MB. Each ECC block holds entries of use statuses and ECCs corresponding to 8K entries in association with logical pages. The use status is 1-byte information and indicates whether this entry is in use or unused. The ECC is allocated 7 bytes since importance is given to a correction ability, but it may be allocated 4 bytes as in the first embodiment.

When reading from the data portion of the physical page in the data area of the memory 300 is performed, the memory controller 200 reads an ECC from the ECC block in which a corresponding ECC is stored, and performs error correction on the data portion. Alternatively, when writing to the data portion of the physical page in the data area of the memory 300 is performed, the memory controller 200 writes a generated ECC in the ECC block in which a corresponding ECC is stored.

The ECC table 315 described here can be operated by a procedure similar to the address translation table 311 according to the first embodiment described above. In other words, the ECC table 315 can be stored in the memory extension area 121 and used. Then, a use area of the ECC table 315 can be appropriately changed.

FIG. 34 is a diagram illustrating a field configuration example of the memory extension area management table 221 according to the second embodiment of the present technology. Similarly to the first embodiment, the memory extension area management table 221 according to the second embodiment includes fields such as an "index number," a "use status," a "division number," a "start address," and a "size." However, in this second embodiment, since 1024 ECC blocks are assumed, indices in the memory extension area management table 221 are assumed to be 1024 indices from 0 to 1023. A process related to the memory extension area management table 221 according to the second embodiment is similar to that of the first embodiment.

Thus, according to the second embodiment of the present technology, it is possible to flexibly change the used area for the ECC table 315 in the memory extension area 121.

<3. Third Embodiment>

In the first embodiment, the address translation table is stored in the memory extension area 121, but in a third embodiment, the data stored in the memory 300 is stored in the memory extension area 121. In other words, in the third embodiment, the memory extension area 121 is used as a cache memory for holding data accessed from the host computer 100. Since overviews of a system configuration and a process are similar to those of the first embodiment described above, description thereof will be omitted here.

Figure 35:
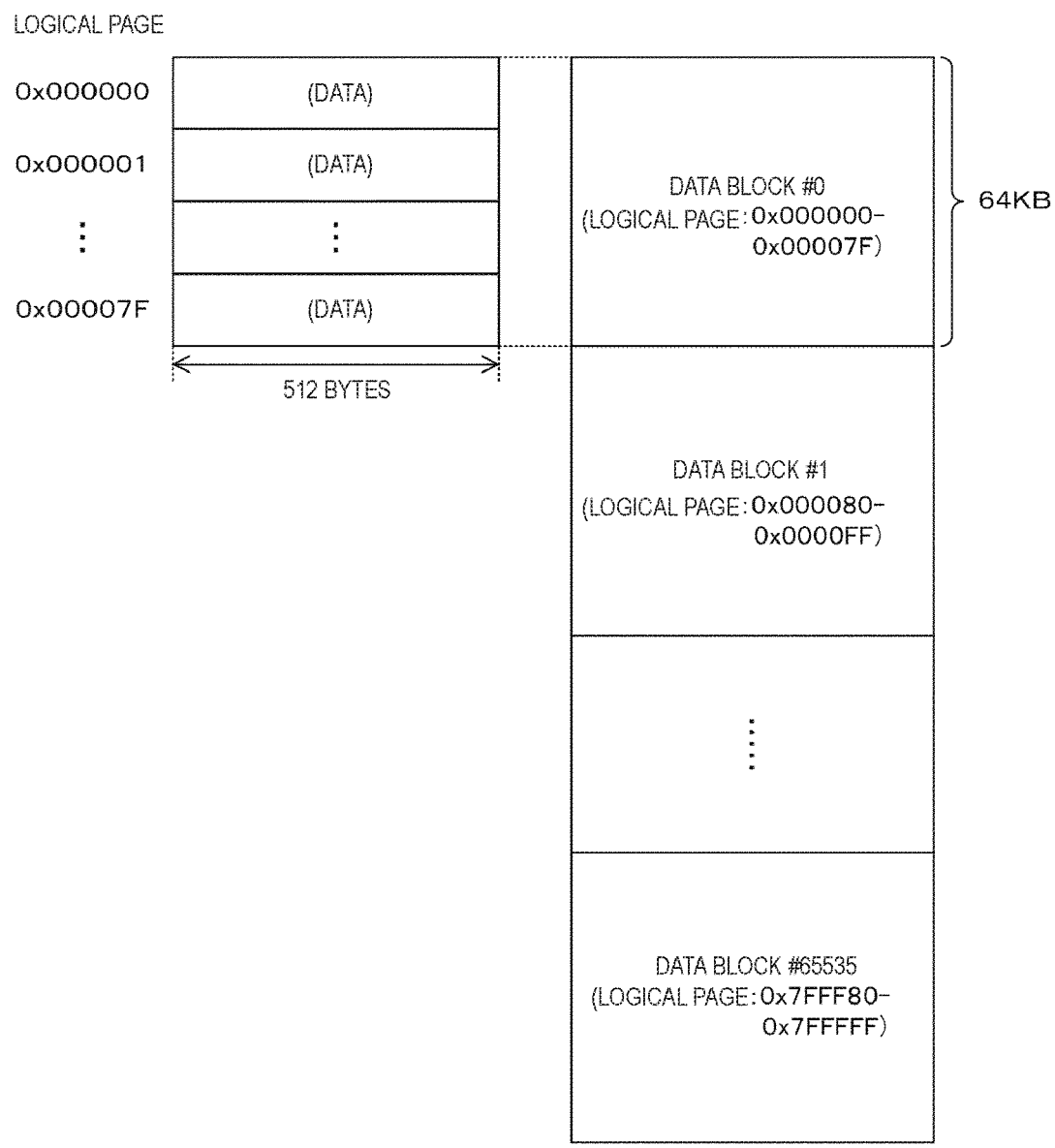
FIG. 35 is a diagram illustrating an example of a management format of data stored in a memory extension area 121 according to a third embodiment of the present technology.

FIG. 35 is a diagram illustrating an example of a management format of data stored in the memory extension area 121 according to the third embodiment of the present technology. In the third embodiment, a data block of 64 Kbytes obtained by grouping 128 pieces of data each having 512 bytes is managed as a unit. Data block numbers 0 to 65535 are allocated to 65536 data blocks.

[Table Group Held in Controller Memory]

Figure 36:
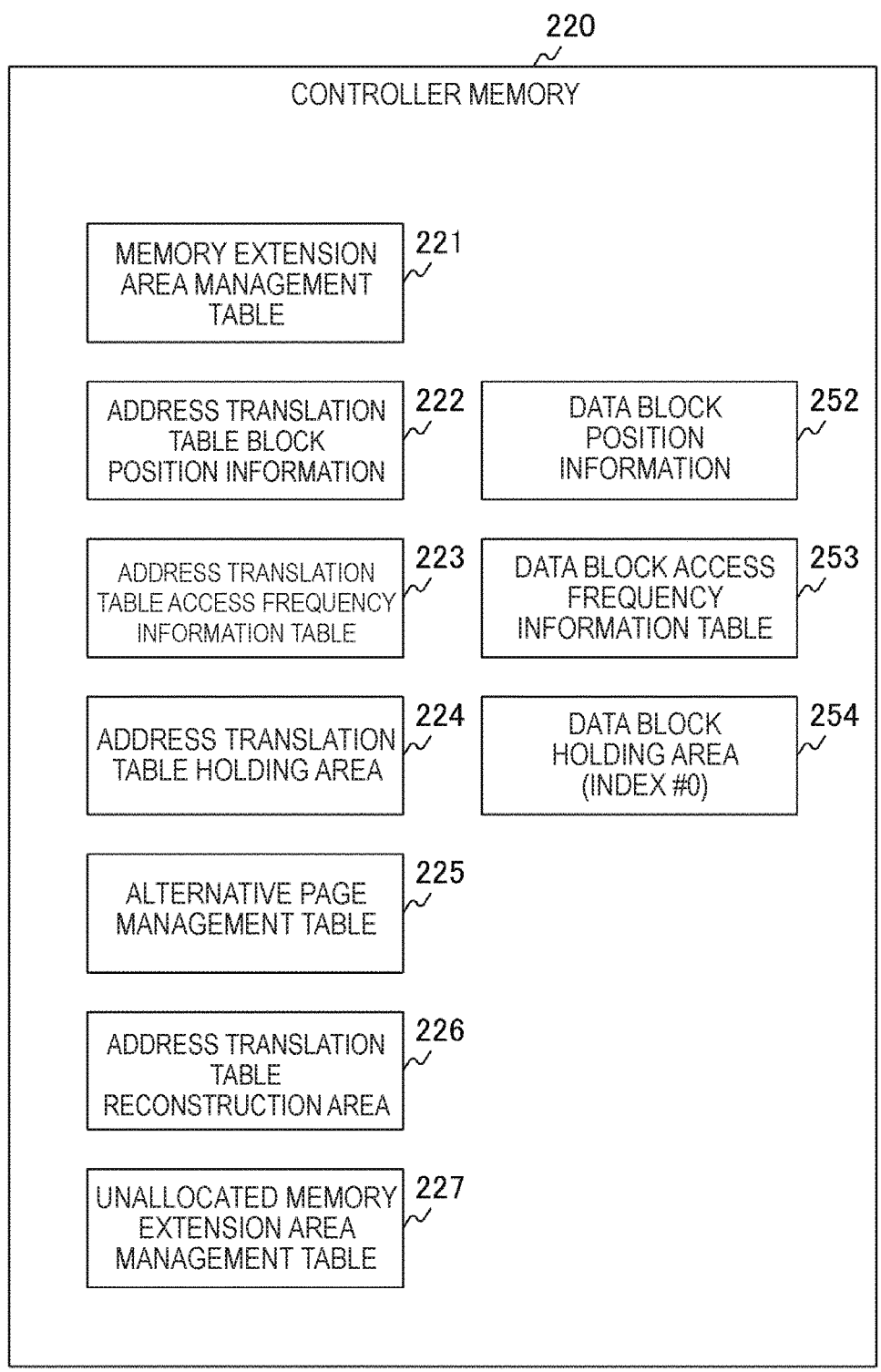
FIG. 36 is a diagram illustrating an example of a table group held in a controller memory 220 according to an embodiment of the present technology.

FIG. 36 is a diagram illustrating an example of a table group held in the controller memory 220 according to the embodiment of the present technology. Here, similarly to the first embodiment, a memory extension area management table 221, address translation table block position information 222, and an address translation table access frequency information table 223 are provided as a table group held in the controller memory 220. Further, similarly to the first embodiment, an address translation table holding area 224, an alternative page management table 225, an address translation table reconstruction area 226, and an unallocated memory extension area management table 227 are provided.

In the third embodiment, data block position information 252, a data block access frequency information table 253, and a data block holding area 254 are further provided. The data block position information 252 is a table indicating a storage position of each data block. The data block access frequency information table 253 is a table illustrating an access frequency for each data block.

The data block holding area 254 is a memory area in which the memory controller 200 directly performs transmission and reception of data with the host computer 100 in response to the read command or the write command from the host computer 100. The size of this data block holding area 254 is assumed to be equal to the size of one data block. In the case of the read command, the memory controller 200 transmits some or all data of the data block holding area 254 to the host computer 100. In the case of the write command, the memory controller 200 updates some or all data of the data block holding area 254 with the data received from the host computer 100. When an address other than a logical address of data held in the data block holding area 254 is designated by the read command or the write command of the host computer 100, switching of data occurs.

In other words, when there is no data designated in the command issued from the host computer 100 in the data block in the data block holding area 254, if there is designated data in the memory extension area 121, the data is transferred to the data block holding area 254. On the other hand, if there is no designated data in the memory extension area 121, it is transferred from the memory 300 to the data block holding area 254. Further, it is necessary to remove the data in the data block holding area 254 before the transfer, but either the memory extension area 121 or the memory 300 is decided as a removal destination on the basis of the data block access frequency information table 253.

FIG. 37 is a diagram illustrating a field configuration example of the memory extension area management table 221 according to the third embodiment of the present technology. Similarly to the first embodiment, the memory extension area management table 221 according to the third embodiment includes fields such as an "index number," a "use status," a "division number," a "start address," and a "size." However, in this third embodiment, since 65536 data blocks are assumed, indices in the memory extension area management table 221 are assumed to be 65536 indices from 0 to 65535.

FIG. 38 is a diagram illustrating a field configuration example of the data block position information 252 according to the third embodiment of the present technology. Similarly to the address translation table block position information 222, the data block position information 252 according to the third embodiment includes fields such as a "data block number," "latest data," a "controller memory index number," and a "memory extension area index number." However, in this third embodiment, since 65536 data blocks are assumed, indices in the data block position information 252 are assumed to be indices 65536 from 0 to 65535.

FIG. 39 is a diagram illustrating a field configuration example of the data block access frequency information table 253 according to the third embodiment of the present technology. Similarly to the address translation table access frequency information table 223, the data block access frequency information table 253 has fields such as a "data block number" and an "access frequency." However, in this third embodiment, since 65536 data blocks are assumed, indices in the data block access frequency information table 253 are assumed to be 65536 indices from 0 to 65535.

[Operation of Information Processing System]

Figure 40:
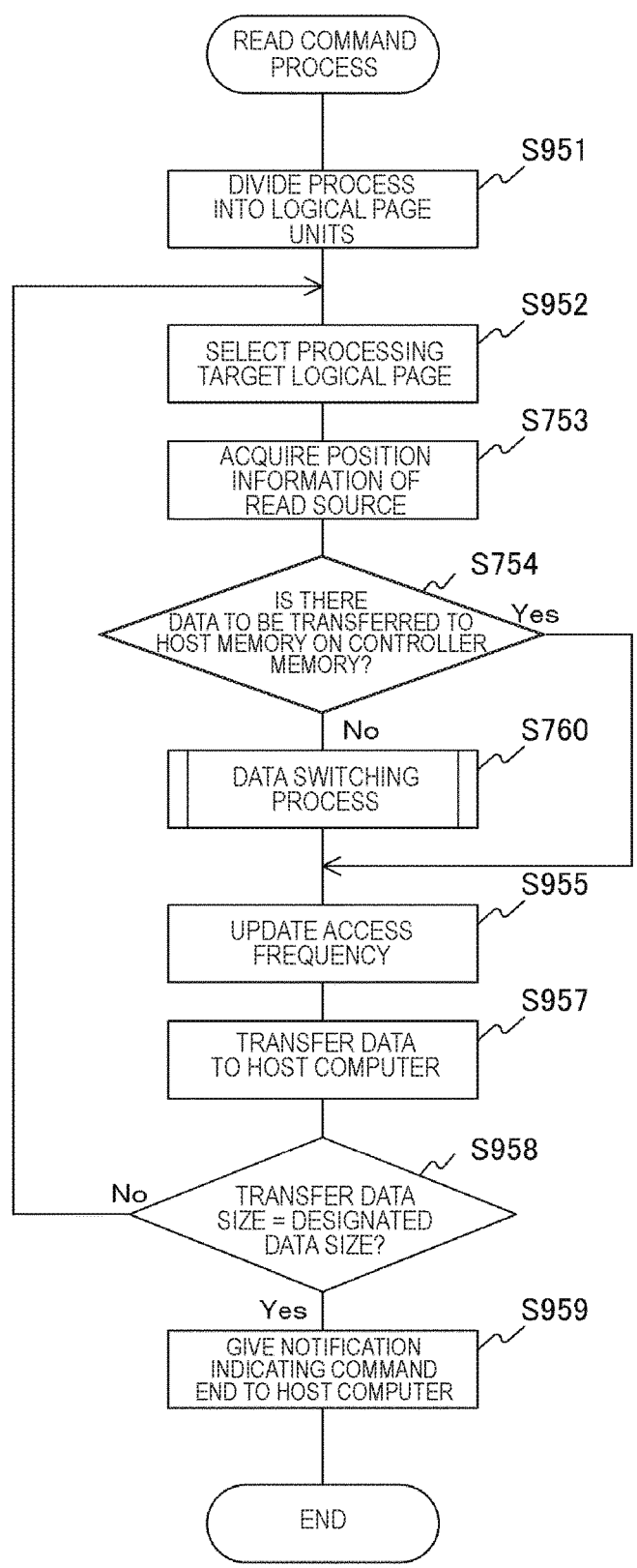
FIG. 40 is a flowchart illustrating a procedure example of a read command process by a command execution task of a memory controller 200 according to a third embodiment of the present technology.

FIG. 40 is a flowchart illustrating a procedure example of the read command process by the command execution task of the memory controller 200 according to the third embodiment of the present technology. A processing procedure according to the third embodiment is basically similar to that of the first embodiment but differs in that steps S753, S754 and S760 are provided instead of steps S953, S960 and S954 as will described below.

The controller processing unit 210 acquires position information as a read source of data of the logical address selected in step S952 (step S753). When corresponding data is held in two or more of the host memory 120, the controller memory 220 and the memory 300, the latest data is assumed to be data to be transferred to the host computer 100. The controller processing unit 210 specifies the latest data from the data block position information 252.

The controller processing unit 210 determines whether or not data to be transferred to the host computer 100 specified in step S753 is held in the controller memory 220 (step S754). When data to be transferred is not held in the controller memory 220 (No I step S754), the process of switching the data block is performed in the memory extension area management task (step S960). In the process of switching the data block, a data block number is designated. Thereafter, the controller processing unit 210 transfers data at the logical address selected in step S952 from the data block holding area 254 of the controller memory 220 to the host computer 100 (step S957).

Figure 41:
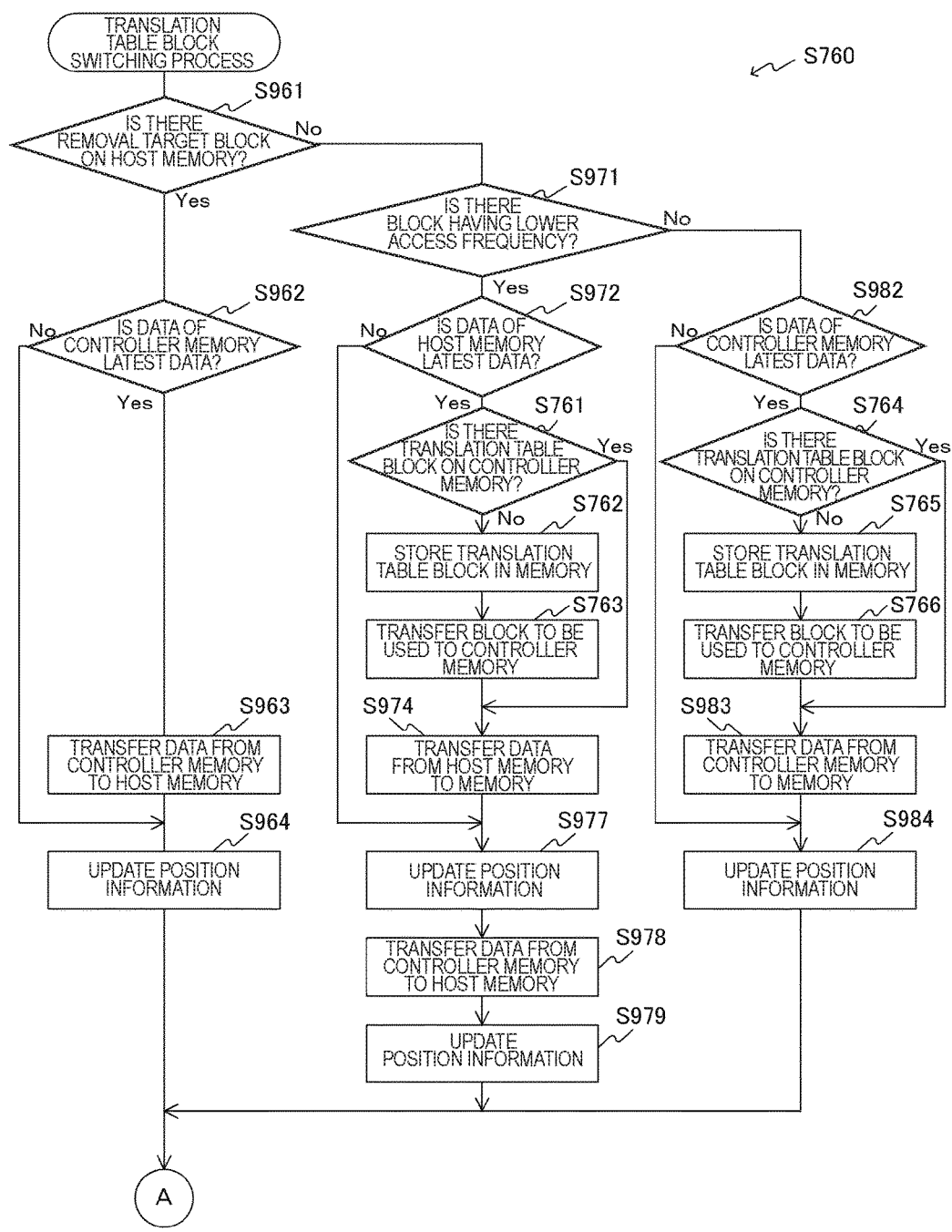
FIG. 41 is a flowchart illustrating a first half of a procedure example of the data block switching process (step S760) by a memory extension area management task of the memory controller 200 according to the third embodiment of the present technology.
Figure 42:
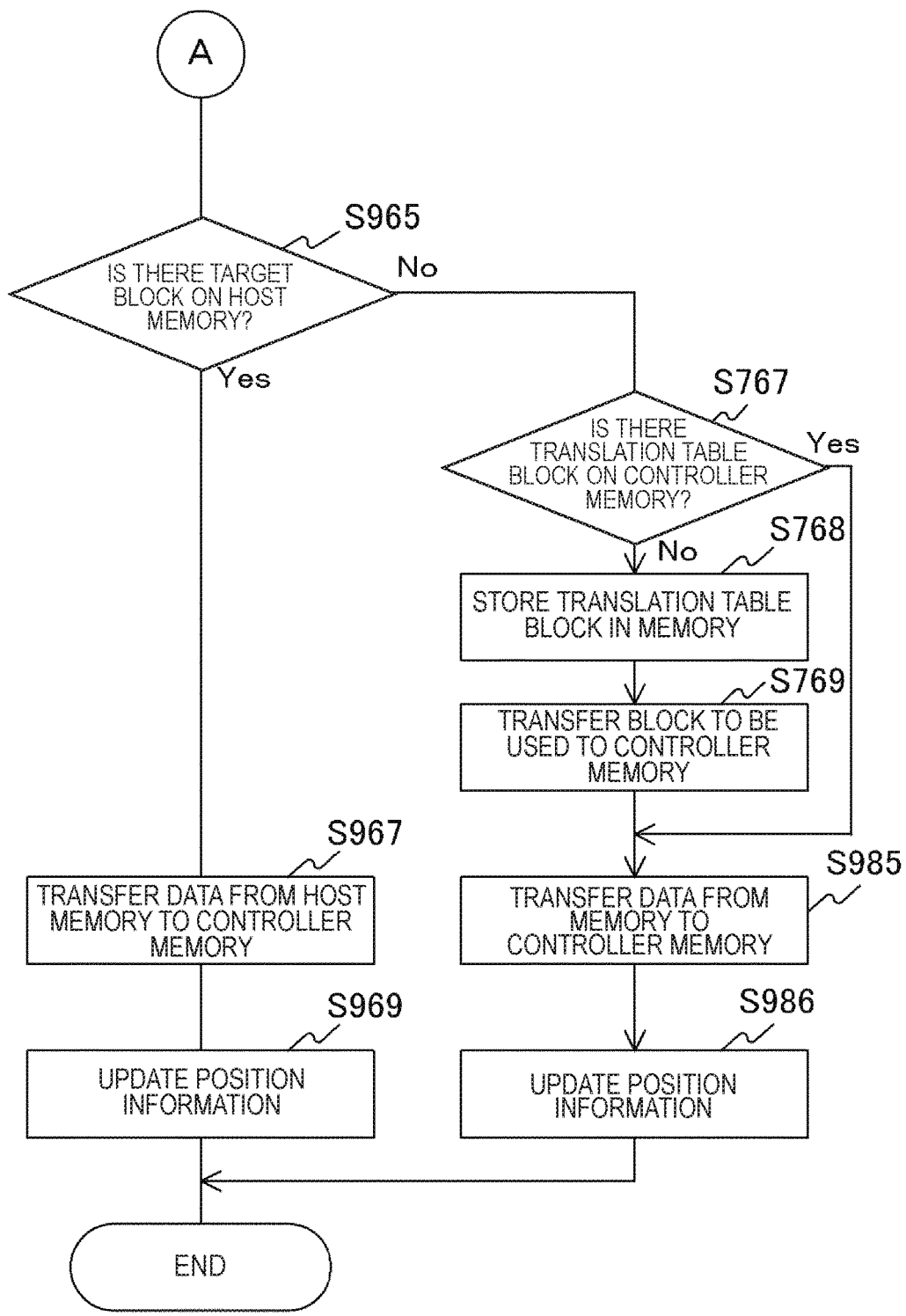
FIG. 42 is a flowchart illustrating a second half of the procedure example of the data block switching process (step S760) by the memory extension area management task of the memory controller 200 according to the third embodiment of the present technology.

FIGS. 41 and 42 are flowcharts illustrating a procedure example of the data block switching process (step S760) by the memory extension area management task of the memory controller 200 according to the third embodiment of the present technology. The data block switching process according to the third embodiment is basically similar to the address translation table block switching process of the first embodiment. However, as will be described below, in this third embodiment, a difference lies in that the data block is held in the memory extension area 121, whereas the address translation table is not held in the memory extension area 121 but read out from the memory 300 as necessary.

The controller processing unit 210 determines whether or not there is a data block of a number held in the controller memory 220 in the host memory 120 with reference to the data block position information 252 (step S961). When the data block number is held in the controller memory 220 in the host memory 120 (Yes in step S961), step S962 and steps subsequent thereto are performed. When the data block number is not held in the controller memory 220 in the host memory 120 (No in step S961), step S971 and steps subsequent thereto are performed.

The controller processing unit 210 determines whether or not data of the data block number held in the controller memory 220 is the latest data with reference to the data block position information 252 (step S962). When the latest data is held in the controller memory 220 (Yes in step S962), the controller processing unit 210 refers to the memory extension area management table 221 and the data block position information 252. Then, the data of the data block held in the controller memory 220 is transferred to the area in which the data of the data block of the same number in the host memory 120 is held (step S963).

The controller processing unit 210 updates the "latest data" and the "controller memory index number" corresponding to the data block number held in the controller memory 220 among the data block position information 252 (step S964). At this time, the "controller memory index number" is updated to an invalid value (0xFF). Alternatively, when the "latest data" is the "controller memory," it is updated to the "host memory." On the other hand, when the "latest data" is the "host memory" or the "memory," updating is not performed.

The controller processing unit 210 determines whether or not there is a data block having a lower access frequency than the data block held in the controller memory 220 in the host memory 120 with reference to the data block access frequency information table 253 (step S971). When there is a data block having a lower access frequency in the host memory 120 (Yes in step S971), step S972 and steps subsequent thereto are performed. When there is no data block having a low access frequency in the host memory 120 (No in step S971), step S982 and steps subsequent thereto are performed.

The controller processing unit 210 selects the data block number having the lowest access frequency among the data blocks in the host memory 120. It is determined whether or not the "latest data" is the "host memory" with reference to the data block position information 252 for the selected data block number, (step S972). When the "latest data" is the "host memory" (Yes in step S972), step S761 and steps subsequent thereto are performed. If the "latest data" is not "host memory" (No in step S972), step S977 and steps subsequent thereto are performed.

The controller processing unit 210 specifies the physical address of the memory 300 with reference to the address translation table in order to change a storage destination of the data block of the number selected in step S972 from the host memory 120 to the memory 300. Then, the controller processing unit 210 determines whether or not there is an address translation table for specifying the storage destination of the data block of the selected number in the address translation table holding area 224 of the controller memory 220 (step S761). When the address translation table is in the address translation table holding area 224 (Yes in step S761), step S974 and steps subsequent thereto are performed. When the address translation table is not in the address translation table holding area 224 (No in step S761), step S762 and steps subsequent thereto are performed.

The controller processing unit 210 stores the address translation table held in the address translation table holding area 224 of the controller memory 220 in the memory 300 (step S762). Then, the controller processing unit 210 reads the address translation table for specifying the storage destination of the data of the data block of the number selected in step S972 out to the address translation table holding area 224 of the controller memory 220 (step S763).

The controller processing unit 210 stores the data of the data block number selected in step S972 in the memory 300 with reference to the address translation table held in the controller memory 220 (step S974).

The controller processing unit 210 updates the "latest data" and the "host memory index number" of the data block selected in step S972 among the data block position information 252 (step S977). At this time, the "host memory index number" is updated to an invalid value (0xFFFFF). Further, when the "latest data" is the "host memory," it is updated to the "memory." On the other hand, when the "latest data" is the "memory," updating is not performed.

The controller processing unit 210 saves the data block held in the controller memory 220 in the host memory 120 and causes the data block holding area 254 of the controller memory 220 to enter a usable state (step S978). At this time, the memory extension area management table 221 and the data block position information 252 are referred to. Then, the data of the data block held in the controller memory 220 is transferred to the area in the host memory 120 in which the data block of the number selected in step S972 is held.

The controller processing unit 210 updates the "latest data," the "controller memory index number," and the "host memory index number" of the data block number held in the controller memory 220 among the data block position information 252 (step S979). At this time, the "controller memory index number" is updated to an invalid value (0xFF). The "host memory index number" is updated to the index number of the transferred memory extension area 121. When the "latest data" is the "controller memory," it is updated to the "host memory." On the other hand, when the "latest data" is the "host memory" or the "memory," updating is not performed.

The controller processing unit 210 determines whether or not the data of the data block number held in the controller memory 220 is the latest data (step S982). When the data of the data block number held in the controller memory 220 is the latest data (Yes in step S982), step S764 and steps subsequent thereto are performed. When the data of the data block number held in the controller memory 220 is not the latest data (No in step S982), step S984 and steps subsequent thereto are performed.

The controller processing unit 210 specifies the physical address of the memory 300 with reference to the address translation table in order to change the storage destination of the data block from the controller memory 220 to the memory 300. Then, the controller processing unit 210 determines whether or not there is an address translation table for specifying the storage destination of the data block held in the controller memory 220 in the address translation table holding area 224 (step S764). When there is an address translation table for specifying the storage destination of the data block held in the controller memory 220 in the address translation table holding area 224 (Yes in step S764), from step S983 and steps subsequent thereto are performed. When there is no address translation table for specifying the storage destination of the data block held in the controller memory 220 in the address translation table holding area 224 (No in step S764), step S765 and steps subsequent thereto are performed.

The controller processing unit 210 stores the address translation table of the controller memory 220 in the memory 300 (step S765). Then, the controller processing unit 210 transfers the address translation table for specifying the storage destination of the data of the data block number selected in step S972 to the controller memory 220 (step S766).

The controller processing unit 210 stores the data of the data block number held in the controller memory 220 in the memory 300 with reference to the address translation table held in the controller memory 220 (step S983).

The controller processing unit 210 updates the "latest data" and the "controller memory index number" corresponding to the data block number held in the controller memory 220 among the data block position information 252 (step S984). At this time, the "controller memory index number" is updated to an invalid value (0xFF). Further, when the "latest data" is the "controller memory," it is updated to the "memory." On the other hand, when the "latest data" is the "memory," updating is not performed.

The controller processing unit 210 determines whether or not the data block of the number designated at the time of executing the data block switching process is held in the memory extension area 121 of the host memory 120 (step S965). When the data block of the number designated at the time of executing the data block switching process is held in the memory extension area 121 (Yes in step S965), step S967 and steps subsequent thereto are performed. When the data block of the number designated at the time of executing the data block switching process is not held in the memory extension area 121 (step S965: No), step S767 and steps subsequent thereto are performed.

The controller processing unit 210 refers to the memory extension area management table 221 and the data block position information 252. Then, the data of the data block number designated at the time of executing the data block switching process is transferred from the memory extension area 121 of the host memory 120 to the data block holding area 254 of the controller memory 220 (step S967).

The controller processing unit 210 updates the "latest data" and the "controller memory index number" corresponding to the data block number held in the controller memory 220 among the data block position information 252 (step S969). At this time, the "controller memory index number" is updated to "0x00."

In order to read the data block of the memory 300 out to the controller memory 220, the controller processing unit 210 specifies the physical address of the memory 300 with reference to the address translation table. The controller processing unit 210 determines whether or not there is an address translation table for specifying the read source of the data block in the address translation table holding area 224 of the controller memory 220 (step S767). When there is an address translation table for specifying the read source of the data block in the address translation table holding area 224 (Yes in step S767), step S985 and steps subsequent thereto are performed. When there is no address translation table for specifying the read source of the data block in the address translation table holding area 224 (No in step S767), step S768 and steps subsequent thereto are performed.

The controller processing unit 210 stores the address translation table of the controller memory 220 in the memory 300 (step S768). Then, the controller processing unit 210 reads the address translation table for specifying the storage destination of the data of the data block number selected in step S972 into the controller memory 220 (step S769).

The controller processing unit 210 transfers the data of the data block number designated at the time of executing the data block switching process from the memory 300 to the memory extension area 121 of the host memory 120 (step S985).

The controller processing unit 210 updates the "controller memory index number" corresponding to the data block number designated at the time of executing the data block switching process among the data block position information 252. At this time, the "controller memory index number" is updated to "0x00."

FIG. 43 is a flowchart illustrating a procedure example of the write command process by the command execution task of the memory controller 200 according to the third embodiment of the present technology. A processing procedure according to the third embodiment is basically similar to that of the first embodiment but differs in that steps S713, S714 and S720 are provided instead of steps S813, S820 and S814 as will described below.

The controller processing unit 210 acquires position information as a read source of data of the logical address selected in step S812 (step S713). When corresponding data is held in two or more of the host memory 120, the controller memory 220 and the memory 300, the latest data is assumed to be data to be transferred to the host computer 100. The controller processing unit 210 specifies the latest data from the data block position information 252.

The controller processing unit 210 determines whether or not data to be transferred to the host computer 100 specified in step S713 is held in the controller memory 220 (step S714). When data to be transferred is not held in the controller memory 220 (No I step S714), the process of switching the data block is performed in the memory extension area management task (step S720). In the process of switching the data block, a data block number is designated. Content of the data block switching process is similar to that described in FIGS. 41 and 42. Thereafter, the controller processing unit 210 transfers the data received from the host computer 100 to the data block holding area 254 of the controller memory 220 (step S816).

As described above, according to the third embodiment of the present technology, it is possible to flexibly change the use area for holding the data block in the memory extension area 121.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

In addition, the processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described here are not necessarily limited, and any effect that is desired to be described in the present disclosure may be exhibited.

Additionally, the present technology may also be configured as below.

(1)

A memory controller, including:

a controller memory configured to store data corresponding to an area allocated to a memory in the memory controller configured to control the memory;

an access control unit configured to allocate a partial area of the controller memory to a host memory in a host computer and use the area as a memory extension area; and an extension area managing unit configured to perform management in which a size of the memory extension area in the host memory is changeable.

(2)

The memory controller according to (1).

in which the extension area managing unit checks the size of the memory extension area in the host memory acquired in the host computer and transmits information indicating whether or not the size satisfies a condition to the host computer.

(3)

The memory controller according to (1) or (2), in which the extension area managing unit releases at least a part of the memory extension area in the host memory in response to a request from the host computer and gives a notification of an address of the released memory extension area to the host computer.

(4)

The memory controller according to any of (1) to (3), in which the extension area managing unit saves content stored in the memory extension area of the host memory in the memory in response to a request from the host computer.

(5)

The memory controller according to any of (1) to (4), in which the extension area managing unit manages a status of access to the memory extension area and notifies the host computer of the status of the access in response to a request from the host computer.

(6)

The memory controller according to any of (1) to (5), further including, a parameter managing unit configured to manage a parameter including a size which is capable of being dealt with as the memory extension area in the host memory and notify the host computer of the parameter in response to a request from the host computer.

(7)

The memory controller according to any of (1) to (6), in which the memory extension area stores an address translation table indicating a correspondence relation between a logical address in the host computer and a physical address in the memory.

(8)

The memory controller according to any of (1) to (6), in which the memory extension area stores an error correcting code used for performing error correction on data stored in the memory.

(9)

The memory controller according to any of (1) to (6), in which the memory extension area stores data exchanged between the host computer and the memory controller.

(10)

An information processing system, including:

a memory;

a host computer;

a controller memory configured to store data corresponding to an area allocated to the memory in a memory controller configured to control the memory;

an access control unit configured to allocate a partial area of the controller memory to a host memory in the host computer and use the area as a memory extension area; and an extension area managing unit configured to perform management in which a size of the memory extension area in the host memory is changeable.

(11)

A memory extension area management method in a memory controller including a controller memory configured to store data corresponding to an area allocated to a memory in the memory controller configured to control the memory, an access control unit configured to allocate a partial area of the controller memory to a host memory in a host computer and use the area as a memory extension area, and an extension area managing unit configured to perform management in which a size of the memory extension area in the host memory is changeable, the memory extension area management method including:

a process of receiving an area acquisition notification including an acquisition size acquired as the memory extension area from the host computer;

a process of calculating a total size secured as the memory extension area on a basis of the acquisition size; and a process of transmitting a response indicating normal to the host computer when the total size satisfies a predetermined condition.

REFERENCE SIGNS LIST 100 host computer
101 application program
102 host OS
103 device driver
110 host processing unit
120 host memory
121 memory extension area
131 parameter acquiring unit
132 area acquiring unit
133 release requesting unit
134 save requesting unit
135 access command issuing unit
170 controller interface
190 host bus
200 memory controller
210 controller processing unit
211 parameter managing unit
212 extension area managing unit
213 access control unit
220 controller memory
221 memory extension area management table
222 address translation table block position information
223 address translation table access frequency information table
224 address translation table holding area
225 alternative page management table
226 address translation table reconstruction area
227 unallocated memory extension area management table
230 ROM
240 ECC processing unit
250 integrity processing unit
252 data block position information
253 data block access frequency information table
254 data block holding area
270 host interface
280 memory interface
290 controller bus
300 memory
310 memory cell array
311 address translation table
312 address translation table block access frequency information
313 defective page management table
314 alternative page management table
315 ECC table
320 memory cell array control unit
330 address decoder
340 data buffer
370 controller interface
390 memory bus
400 storage device

The invention claimed is:

1. A memory controller comprising:
a host interface configured to interface with a host computer;
a memory interface configured to interface with a memory;
a controller memory; and
a controller processing unit including
an access control unit configured to access an area of a host memory in the host computer and use the area as a memory extension area to the memory,
an extension area managing unit configured to perform management in which a size of the memory extension area in the host memory is changeable, and
a parameter managing unit configured to manage one or more parameters of the memory extension area,
wherein the controller processing unit is configured to
control the host interface to transmit an activation notification to the host computer,
receive a parameter query from the host computer via the host interface,
control the host interface to transmit a query response including the one or more parameters that are managed by the parameter managing unit,
receive an area acquisition notification from the host computer via the host interface,
determine whether the area acquisition notification indicates a size of memory extension area that satisfies the one or more parameters that are managed by the parameter managing unit,
responsive to determining that the area acquisition notification indicates the size of memory extension area that does satisfy the one or more parameters, control the host interface to transmit a positive acknowledgement to the host computer,
responsive to controlling the host interface to transmit the positive acknowledgement, control the memory interface to transmit a read request to the memory, and
responsive to controlling the memory interface to transmit the read request to the memory, control the memory interface, the controller memory, and the host interface to transfer first data from the memory to the memory extension area in the host computer.

2. The memory controller according to claim 1, wherein the extension area managing unit is further configured to
check the size of the memory extension area in the host memory acquired in the host computer, and
control the host interface to transmit information indicating whether or not the size satisfies a condition to the host computer.

3. The memory controller according to claim 1, wherein the extension area managing unit is further configured to
release at least a part of the memory extension area in the host memory in response to a request from the host computer, and
output a notification of an address of the part of the memory extension area that is released to the host computer.

4. The memory controller according to claim 1, wherein the extension area managing unit is further configured to save content stored in the memory extension area of the host memory in the memory in response to a request from the host computer.

5. The memory controller according to claim 1, wherein the extension area managing unit is further configured to
manage a status of access to the memory extension area, and
notify the host computer of the status of access the memory extension area in response to a request from the host computer.

6. The memory controller according to claim 1, wherein the one or more parameters include a memory extension area size parameter indicative of a size which is capable of being dealt with as the memory extension area in the host memory, and wherein the parameter managing unit is configured to notify the host computer of the memory extension area size parameter in response to a request from the host computer.

7. The memory controller according to claim 1,
wherein the controller processing unit is further configured to control the host interface to store an address translation table in the memory extension area, the address translation table indicating a correspondence relation between a logical address in the host computer and a physical address in the memory.

8. The memory controller according to claim 1,
wherein the controller processing unit is further configured to control the host interface to store an error correcting code in the memory extension area, the error correcting code being used for performing error correction on second data stored in the memory.

9. The memory controller according to claim 1,
wherein the controller processing unit is further configured to control the host interface to store third data exchanged between the host computer and the memory controller in the memory extension area.

10. An information processing system, comprising:
a memory;
a host computer;
a memory controller including
a host interface configured to interface with the host computer,
a memory interface configured to interface with the memory,
a controller memory, and
a controller processing unit including
an access control unit configured to allocate an area of a host memory in the host computer and use the area as a memory extension area to the memory,
an extension area managing unit configured to perform management in which a size of the memory extension area in the host memory is changeable, and
a parameter managing unit configured to manage one or more parameters of the memory extension area,
wherein the controller processing unit is configured to
control the host interface to transmit an activation notification to the host computer,
receive a parameter query from the host computer via the host interface,
control the host interface to transmit a query response including the one or more parameters that are managed by the parameter managing unit,
receive an area acquisition notification from the host computer via the host interface,
determine whether the area acquisition notification indicates a size of memory extension area that satisfies the one or more parameters that are managed by the parameter managing unit,
responsive to determining that the area acquisition notification indicates the size of memory extension area that does satisfy the one or more parameters, control the host interface to transmit a positive acknowledgement to the host computer,
responsive to transmitting the positive acknowledgement to the host computer, control the memory interface to transmit a read request to the memory, and
responsive to transmitting the read request to the memory, control the memory interface, the controller memory, and the host interface to transfer data from the memory to the memory extension area in the host computer.

11. A memory extension area management method comprising:
controlling, with a controller processing unit of a memory controller, a host interface to transmit an activation notification to a host computer to activate a memory extension area in a host memory of the host computer;
receiving, with the controller processing unit, a parameter query from the host computer via the host interface;
controlling, with the controller processing unit, the host interface to transmit a query response including one or more parameters that are managed by a parameter managing unit;
receiving, with the controller processing unit, an area acquisition notification from the host computer via the host interface;
determining, with the controller processing unit, whether the area acquisition notification indicates a size of memory extension area that satisfies the one or more parameters that are managed by the parameter managing unit;
responsive to determining that the area acquisition notification indicates the size of memory extension area that does satisfy the one or more parameters, controlling, with the controller processing unit, the host interface to transmit a positive acknowledgement to the host computer;
responsive to transmitting the positive acknowledgement to the host computer, controlling, with the controller processing unit, a memory interface to transmit a read request to a memory; and
responsive to controlling the memory interface to transmit the read request to the memory, controlling, with the controller processing unit, the memory interface, a controller memory, and the host interface to transfer first data from the memory to the memory extension area,
wherein the memory controller includes the controller processing unit, the memory interface, the controller memory, and the host interface.

12. The memory extension area management method according to claim 11, further comprising:
checking, with the controller processing unit, a size of the memory extension area in the host memory acquired in the host computer; and
controlling, with the controller processing unit, the host interface to transmit information indicating whether or not the size satisfies a condition to the host computer.

13. The memory extension area management method according to claim 11, further comprising:
releasing, with the controller processing unit, at least a part of the memory extension area in the host memory in response to a request from the host computer; and
controlling, with the controller processing unit, the host interface to output a notification of an address of the part of the memory extension area that is released to the host computer.

14. The memory extension area management method according to claim 11, further comprising saving, with the controller processing unit, content stored in the memory extension area of the host memory in the memory in response to a request from the host computer.

15. The memory extension area management method according to claim 11, further comprising:
    managing, with the controller processing unit, a status of access to the memory extension area; and
    controlling, with the controller processing unit, the host interface to notify the host computer of the status of access to the memory extension area in response to a request from the host computer.

16. The memory extension area management method according to claim 11, further comprising:
    controlling, with the controller processing unit, the host interface to notify the host computer of a memory extension area size parameter in response to a request from the host computer,
    wherein the one or more parameters include the memory extension area size parameter indicative of a size which is capable of being dealt with as the memory extension area in the host memory.

17. The memory extension area management method according to claim 11, further comprising controlling, with the controller processing unit, the host interface to store an address translation table in the controller memory, the address translation table indicating a correspondence relation between a logical address in the host computer and a physical address in the memory.

18. The memory extension area management method according to claim 11, further comprising controlling, with the controller processing unit, the host interface to store an error correcting code in the memory extension area, the error correcting code being used for performing error correction on second data stored in the memory.

19. The memory extension area management method according to claim 11, further comprising controlling, with the controller processing unit, the host interface to store third data exchanged between the host computer and the memory controller in the memory extension area.

* * * * *